US012615221B2

(12) United States Patent
Olatunji et al.

(10) Patent No.: US 12,615,221 B2
(45) Date of Patent: *Apr. 28, 2026

(54) SYSTEMS AND METHODS FOR MANAGING RESOURCES ACROSS GLOBAL OR CLOUD NETWORKS

(71) Applicant: Citibank, N.A., New York, NY (US)

(72) Inventors: John Oladapo Olalowo Olatunji, London (GB); Diego Miyake Dos Santos, Tampa, FL (US); Rodolphe De Lassus Saint-Genies, New York, NY (US); Ryan Rhea Rugg, New York, NY (US); Sujay Nanjashetty, London (GB); Ambrish Bansal, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/315,462

(22) Filed: Aug. 29, 2025

(65) Prior Publication Data

US 2025/0392553 A1 Dec. 25, 2025

Related U.S. Application Data

(63) Continuation of application No. 19/195,659, filed on Apr. 30, 2025, now Pat. No. 12,452,191, which is a continuation of application No. 18/979,083, filed on Dec. 12, 2024, now Pat. No. 12,335,168, which is a continuation-in-part of application No. 18/887,688, filed on Sep. 17, 2024, which is a continuation of application No. 18/592,244, filed on Feb. 29, 2024, now Pat. No. 12,095,676.

(51) Int. Cl.
H04L 9/40 (2022.01)
H04L 47/70 (2022.01)

(52) U.S. Cl.
CPC ............. *H04L 47/822* (2013.01); *H04L 9/40* (2022.05); *H04L 47/827* (2013.01)

(58) Field of Classification Search
CPC ........ H04L 47/822; H04L 9/40; H04L 47/827
See application file for complete search history.

(56) References Cited

U.S. PATENT DOCUMENTS

| | | | | |
|---|---|---|---|---|
| 10,621,164 B1 * | 4/2020 | Kain | ..................... | G06F 16/215 |
| 11,706,155 B1 * | 7/2023 | O'Connor | ................. | H04L 9/50 709/226 |
| 2022/0337607 A1 * | 10/2022 | Manevich | .............. | G06N 20/00 |

* cited by examiner

*Primary Examiner* — Minh Chau Nguyen
(74) *Attorney, Agent, or Firm* — Foley & Lardner LLP

(57) ABSTRACT

Systems and methods for managing resources across a global and/or cloud network. In particular, systems and methods for mitigating issues related to providing services while resources are off-line (or may potentially go off-line). For example, the systems and methods may mitigate issues related to providing services while resources are off-line (or may potentially go off-line) by monitoring network services at an aggregate level.

19 Claims, 9 Drawing Sheets

200

300

310

320

315

325

330

340

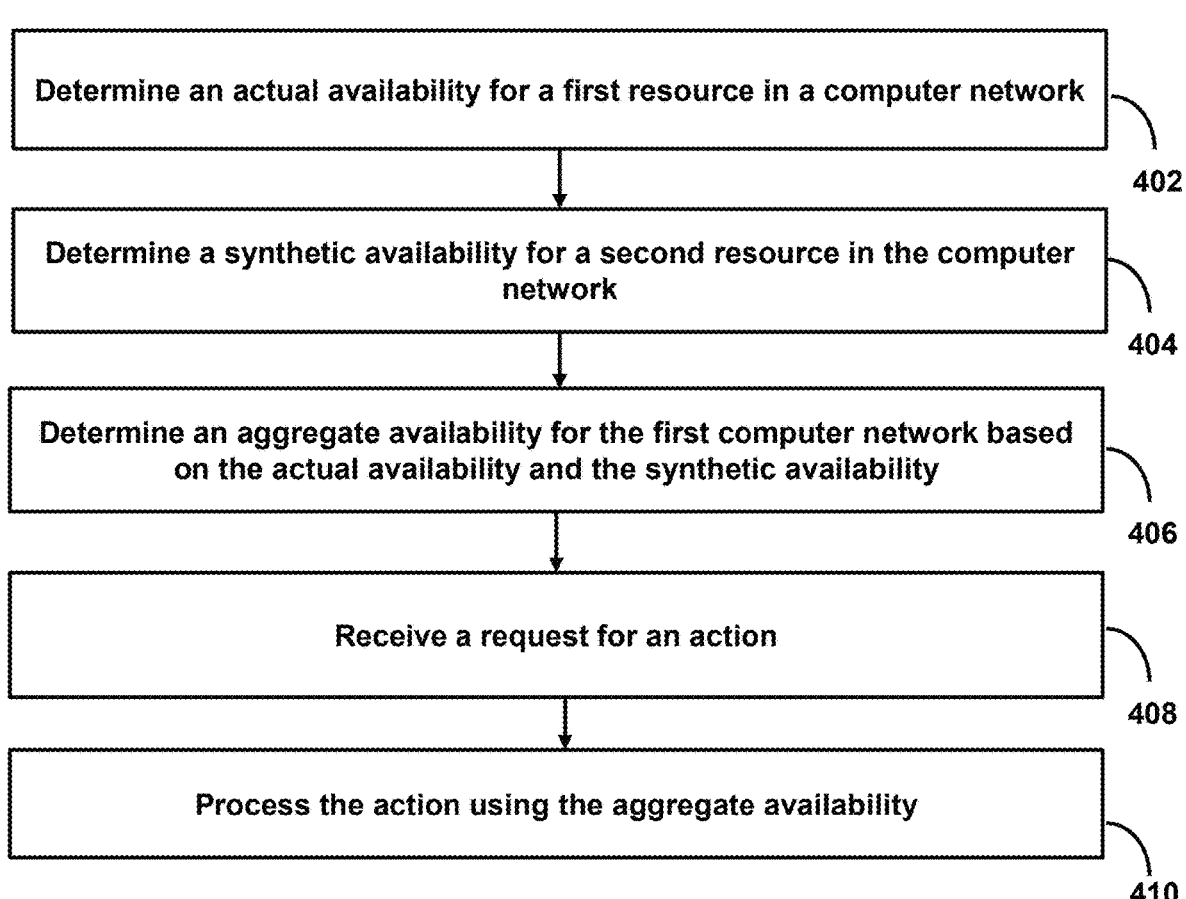

400

Determine an actual availability for a first resource in a computer network
402

Determine a synthetic availability for a second resource in the computer network
404

Determine an aggregate availability for the first computer network based on the actual availability and the synthetic availability
406

Receive a request for an action
408

Process the action using the aggregate availability
410

Determine a first actual availability for a first plurality of resources in a computer network

802

Determine a first synthetic availability for a second plurality of resources in the computer network

804

Determine an aggregate availability for the first computer network

806

Process one or more actions using the first aggregate availability

808

SYSTEMS AND METHODS FOR MANAGING RESOURCES ACROSS GLOBAL OR CLOUD NETWORKS

CROSS REFERENCE TO RELATED APPLICATION(S)

This application is a continuation of U.S. patent application Ser. No. 19/195,659, filed Apr. 30, 2025, which is a continuation of U.S. patent application Ser. No. 18/979,083, filed Dec. 12, 2024, which is a continuation-in-part of U.S. patent application Ser. No. 18/887,688, filed Sep. 17, 2024, which is a continuation of U.S. patent application Ser. No. 18/592,244, filed Feb. 29, 2024. The content of the foregoing applications is incorporated herein in its entirety by reference.

BACKGROUND

Cloud computing refers to the delivery of computing services over the internet (the cloud) to offer on-demand access to a variety of resources, including computing power, storage, databases, networking, and/or software, without direct management or control of the underlying infrastructure by the user. A key characteristic of cloud computing is that it allows for the quick and flexible scaling of resources up or down based on demand. To provide this rescaling, the devices in the cloud computing network must maintain connectivity to the network. If a device loses connectivity to the network, the device is no longer available for use as a network resource.

To mitigate disruptions resulting from the loss of one or more devices in the network, cloud providers often have redundant systems in place across multiple devices, data centers, and/or regions. If one device (or data center) experiences an outage, services can be rerouted to another device (or data center), ensuring continuity of service. This redundancy reduces the impact of random network outages.

However, rerouting services and redundancies have their limits. For example, while a given service may be rerouted if a data center assigned to that service goes off-line, the network still loses the resources of that data center (e.g., the aggregate number of services that can be performed by the network are reduced due to the loss of the data center). If the percentage of resources in a network that goes off-line is too high or the number of services otherwise required exceeds the available resources, the services must be triaged and/or services are suspended.

To further complicate this technical problem, if a resource goes off-line, information about that resource is also inaccessible. For example, information about what services are, or were, being provided by the resource is no longer available. This not only effects services currently being performed (e.g., services that are suspended), but also prevents the network as a whole from obtaining information used to plan and/or route services in the future. For example, the network is no longer able to determine if the resource will have availability for performing future services (e.g., based on services currently being performed being completed, services not currently being scheduled to be performed in the future, and/or services likely to be completed while the resource is off-line).

SUMMARY

In view of the aforementioned technical problems, systems and methods are described herein for managing resources across a global and/or cloud network. In particular, systems and methods are described for mitigating issues related to providing services while resources are off-line (or may potentially go off-line). For example, the systems and methods may mitigate issues related to providing services while resources are off-line (or may potentially go off-line) by monitoring network services at an aggregate level. By doing so, the system may determine what resources, if any, will have availability for performing services (e.g., services currently being performed being completed, services not currently being scheduled, and/or services likely to be completed) irrespective of whether or not a resource is off-line.

However, monitoring network services at an aggregate level presents several technical issues. First, different services may require different resources that may be describe by different terminology and/or may generate usage data related to the different resources in different formats. Furthermore, the way an application uses a resource to perform a service, the availability required, and/or the attributes of that service may be specific to the application and/or resource. To overcome these technical issues, the system generates a tokenized representation of these respective availabilities, which standardizes and abstracts the underlying complexities of different formats and requirements. Using this tokenization, the system may monitor the network services at the aggregate level.

Unfortunately, tokenization alone does not overcome all the technical issues related to monitoring network services at the aggregate level. For example, to generate a proper tokenization of availability at a resource, the system needs to receive updated data related to each service and resource. However, if a resource is off-line, the updated data may not be available. As such, the system may determine a synthetic availability for any resource that is off-line to compliment an actual availability of any resource that is on-line. The system may then tokenize the synthetic availability and actual availability. The tokenization of these availabilities may then be used to monitor the network services at the aggregate level in real-time with the system replacing the tokens of the synthetic availability with actual availability (and vice-versa) as resource come on-line and go off-line.

However, the real-time monitoring of tokens based on synthetic availability and actual availability as well as replacing tokens based on synthetic availability and actual availability as devices comes on-line presents timing and organizational challenges. Furthermore, maintaining a log of the tokens and/or their respective basis (e.g., synthetic or actual availability) creates a fundamental technical flaw in that if the device (or data center) responsible for maintaining the log goes off-line, the entire system is threatened. To overcome this fundamental technical flaw, the system maintains the log through a series of self-executing programs across a decentralized blockchain network. For example, by using the decentralized blockchain network to maintain the log, the loss of any device (or data center) due to the device (or data center) going off-line will not threaten the system or impede its ability to monitoring network services at the aggregate level.

Another problem faced with managing network resources to provide network services is efficiently allocating resources to enable network services to be provided. For example, as each service has its own set of requirements (e.g., required resources, processing requirements, memory requirements, etc.), existing systems may simply identify which resources are available and may select such resources (e.g., allocate resources) based on the requirements of the service. However, such allocation of resources is performed under a "real-time" mindset. That is, existing systems liberally allocate resources for the service based simply on the requirements for that service and the availability of resources that can fulfill those requirements. For example, existing systems may allocate a greater number of dispersed resources to fulfill the requirements of that service. Furthermore, each resource within a computing network may have a set of computational limits (e.g., processing power limits, processing speed, memory limits, storage availability, or other limitations).

To help allocate resources in view of resource limitations, existing systems may allocate a number of resources to a service that is in accordance with these computational limits. However, because this allocation of resources is performed under this "real-time" mindset, when these limits are exceeded (e.g., due to a large volume of requests being processed by the service), existing systems must reallocate resources to provide the service-thereby wasting valuable computational resources (e.g., computer memory and processing resources) to reallocate resources to the service. As such, existing systems may waste valuable computational resources at times where resource availability is needed the most.

To overcome this, the methods and systems described herein may manage resources irrespective of resource readiness to reduce wasted computational resources associated with reallocating computational resources. For example, contrary to existing systems, the system may assume that all resources within a computing network are currently unavailable and/or the computational limitations of such resources are maxed out. To accomplish this, in accordance with one or more embodiments, the system may determine and use synthetic availabilities for each computing resource of the computing network to be used as a basis for allocating resources. For example, as opposed to using actual availability information (e.g., real-time availability information of a resources), the system may use standardized synthetic availability of the resources of the computing network. As the tokenized synthetic availability of a resource may represent that a resource is currently offline (e.g., unavailable) and/or the resource is computationally maxed out, the system is forced to rely on a worst-case scenario basis when allocating resources for a given service.

To do so, the system may determine an aggregate availability for the computer network based on the synthetic availabilities of the computing network. For example, the system may use an artificial intelligence model to determine a network-wide availability of resources using the synthetic availabilities of the computing network to conservatively allocate resources in a worst-case scenario basis. For instance, as opposed to determining the availability of resources when resources are available (or not limited by their computational limits), the system assumes, via the synthetic availabilities that resources are unavailable (or near/at their computational limits). Under this worst-case scenario (or limited) basis, the system may allocate resources for a service by consolidating the amount of resources needed to provide the intended service to reduce future reallocation of resources. By doing so, the system may conservatively allocate (e.g., select) resources, thereby reducing wasted computational resources associated with such reallocation procedures.

In some aspects, systems and methods for managing resources across global or cloud networks while mitigating issues related to providing services while resources are off-line are disclosed. For example, the system may determine, a first self-executing program, a first actual availability for a first resource in a first network, wherein the first resource is currently on-line. The system may determine, a second self-executing program, a first synthetic availability for a second resource in the first network, wherein the second resource is currently off-line. The system may generate an aggregate availability for the first network based on the first synthetic availability and the first synthetic availability. The system may receive a first user request to perform a first blockchain action across the first network. The system may process the first user request by adjusting the aggregate availability based on the first blockchain action.

In some aspects, systems and methods for managing resources across global or cloud networks while mitigating issues related to providing services irrespective of resource readiness are disclosed. For example, the system may determine, using a first self-executing program, a first synthetic availability for a first resource in a first computer network, wherein the first synthetic availability is represented by a first cryptographically secure digital asset in a digital log, and wherein the first synthetic availability is related to a first actual availability for the first resource. The system may determine, using a second self-executing program, a second synthetic availability for a second resource in the first computer network, wherein the second synthetic availability is represented by a second cryptographically secure digital asset in the digital log, and wherein the second synthetic availability is related to a second actual availability for the second resource. The system may determine, using a first artificial intelligence model, a first aggregate availability for the first computer network based on the first synthetic availability and the second synthetic availability. The system may receive a first request to perform a first blockchain action across the first computer network. The system may process the first blockchain action using the first aggregate availability.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRA WINGS

FIG. 4 shows a flowchart of the steps involved in managing resources across global or cloud networks, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
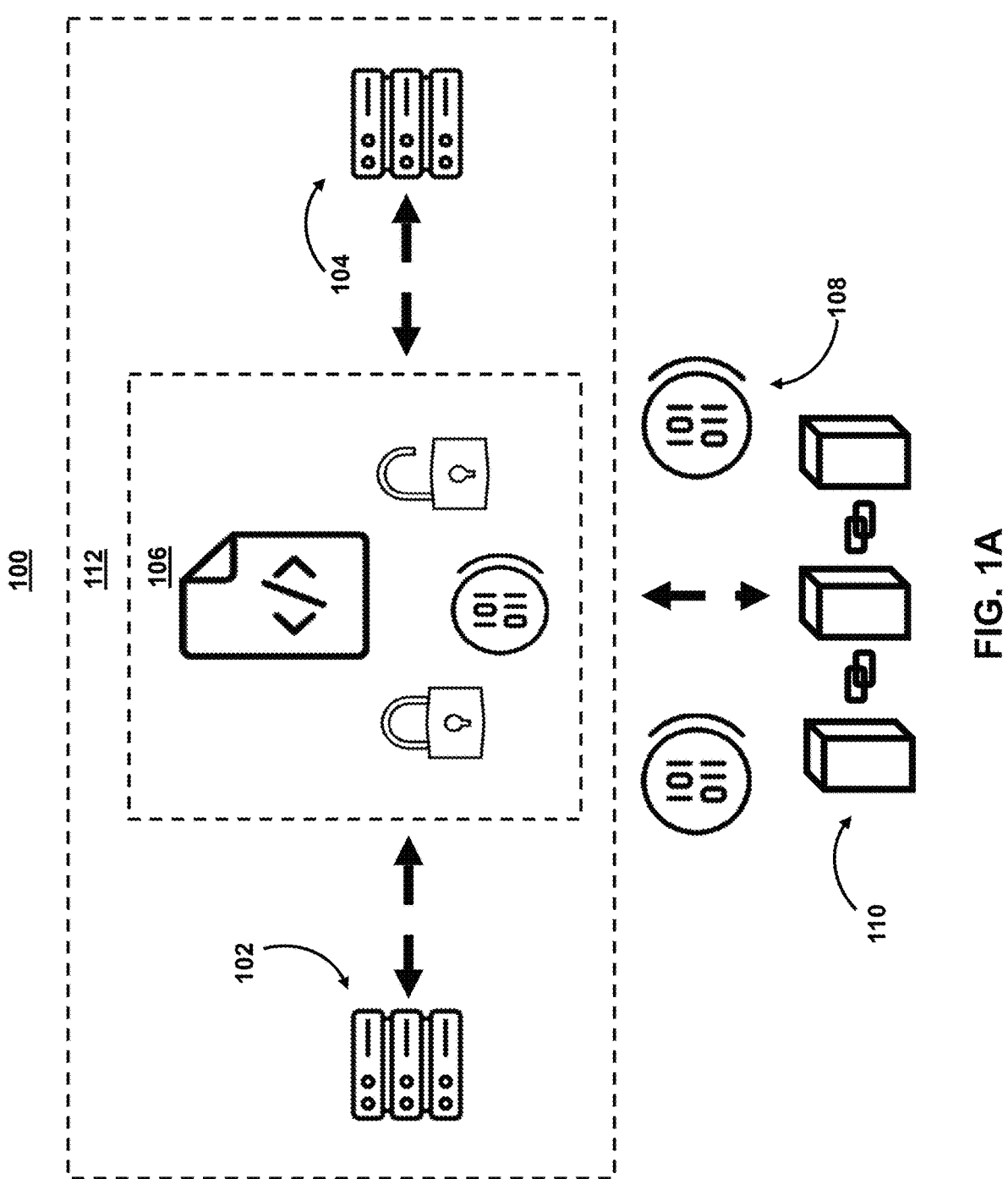
FIG. 1A shows an illustrative architecture for managing resources across global or cloud networks, in accordance with one or more embodiments.

FIG. 1A shows an illustrative architecture for managing resources across global or cloud networks, in accordance with one or more embodiments. For example, system 100 includes a network between two resources (e.g., resource 102 and resource 104). As described herein, a resource may refer to any entity or component within the network that is made available and accessible for use by network users, applications, or devices. These resources can be hardware devices, software applications, or data that are shared across the network for various purposes. Hardware devices may include physical devices connected to the network that can be shared among multiple users or applications. Examples of hardware resources in a network include printers, scanners, servers, routers, switches, storage devices (like NAS-Network Attached Storage), and other peripheral devices. Software resources may be software applications, programs, or services made available for access and utilization over the network. This could include shared databases, file servers, web servers, email servers, application servers, and any other software-based services accessible to network users. Data resources refer to information or data stored and shared within the network. This could include shared files, documents, databases, multimedia content, and any other data that can be accessed and utilized by authorized users or applications within the network. Network resources are typically made accessible through a process called resource sharing or resource sharing protocols, which allow authorized users or devices to access, use, or modify these resources based on permissions and security configurations set by the network administrators. For instance, in a client-server network model, a server could host resources such as files or applications, and client devices can request access to these resources over the network. Access control mechanisms, such as user authentication and permissions, regulate who can access specific resources and what actions they can perform on those resources.

In some embodiments, resources may encompass a wide array of assets, tools, and components that are essential for conducting operations, delivering services, managing finances, and supporting a financial service firm's overall functioning. For example, a resource may comprise financial assets. Financial assets include cash reserves, investments, securities, loans, and other financial instruments held by the firm or managed on behalf of clients. For example, a resource corresponding to a user may comprise a bank account for that user.

In some embodiments, a resource may comprise a bank branch or other subdivision of the firm and/or an amount of liquidity for the bank branch or subdivision. For example, when a resource is a bank branch or other subdivision, the resource may go on and/or off-line based on the operating hours (or regulated trading hours) for the bank branch or subdivision. For example, banks and financial institutions often have specific business hours during which their systems and staff are available to process transactions. Outside these hours, certain banking functions, including fund transfers, may not be processed immediately. Some financial regulations or rules may limit or dictate the processing of certain types of transactions or transfers after regular business hours for security, compliance, or fraud prevention purposes. Banks may also risk management measures in place to detect and prevent fraudulent activities. Transactions initiated after hours may be flagged for additional scrutiny to ensure they are legitimate, which could cause delays.

In some embodiments, system 100 may illustrate one or more communications between resource 102 and resource 104 as managed by a platform application. For example, a platform application may be used to facilitate one or more blockchain actions (e.g., via self-executing program 106) to conduct the communications across computer network 112.

As referred to herein, a computer network may refer to a collection of interconnected computers and other devices that are linked together to share resources, information, and services. These networks can be established using various technologies and configurations, allowing devices to communicate and exchange data with each other. In some embodiments, the computer network may comprise a network for a financial services firm.

In some embodiments, a computer network (or simply network) may refer to the interconnected system of computers, devices, and infrastructure specifically designed and configured to support the operations and services provided by a financial service firm and/or the financial industry. The network infrastructure may enable the firm to process transactions efficiently and securely. This includes services like online banking, wire transfers, trading platforms for stocks and securities, electronic fund transfers, and other financial transactions. For example, financial firms often require connectivity to various financial markets, exchanges, and data providers. The network infrastructure allows access to real-time market data, trade execution platforms, and connections to external financial systems.

In some embodiments, the computer network may comprise a global payment network that facilitate credit and debit card transactions. The network may connect issuing banks, acquiring banks, merchants, and cardholders, enabling electronic payments at point-of-sale terminals and online. In some embodiments, the computer network may comprise an ACH (Automated Clearing House). An ACH is a network used for electronic fund transfers and direct deposits in the United States. It enables the processing of large volumes of credit and debit transactions, including payroll deposits, bill payments, and person-to-person transfers. In some embodiments, the computer network may comprise a SWIFT (Society for Worldwide Interbank Financial Telecommunication) network. SWIFT is a global messaging network used by financial institutions for secure communication and the transfer of financial messages, particularly for international transactions and cross-border payments. In some embodiments, the computer network may comprise a blockchain network.

As described herein, a "platform application" may refer to software or an application that serves as a foundation or infrastructure for developing and deploying other software applications or services. It provides a set of tools, frameworks, and functionalities upon which developers can build, integrate, and run applications. These platforms form the basis for running other software applications. Examples include Windows, macOS, Linux, iOS, and Android. They provide the necessary environment and services for software to execute on devices like computers, smartphones, and tablets.

In some embodiments, the platform application may be used to manage the availability of devices in a computer network. This type of platform application is designed to monitor, control, and manage various devices and components within a network to ensure their availability, performance, and security. The platform application may automatically identify and map devices present on the network, including computers, routers, switches, servers, printers, and other network-connected devices. The platform application may constantly monitor the status and performance metrics (such as bandwidth usage, CPU usage, memory, etc.) of network devices to identify any abnormalities or performance bottlenecks. The platform application may generate alerts or notifications when certain predefined thresholds are breached or when anomalies in network behavior are detected. This helps in proactive issue resolution and prevents network downtime. The platform application may allow administrators to centrally manage and update device configurations, ensuring consistency and compliance with network policies and standards. The platform application may monitor the network for security threats, unauthorized access attempts, malware, and other vulnerabilities, providing insights into potential security breaches.

In some embodiments, the platform application may comprise a platform application for a financial services firm. A platform application, in the context of a financial services firm or a global bank, typically refers to a software application or system that serves as a foundation or framework for delivering various financial services, managing transactions, facilitating communication, and supporting interactions between different entities within the firm or with external stakeholders such as clients, partners, or regulatory bodies. These platform applications may be designed to integrate multiple functionalities and services within a unified infrastructure. These functionalities and services may encompass various aspects such as banking operations (e.g., day-to-day banking operations including customer onboarding, account management, transaction processing, and compliance), trading (e.g., trading functionalities for various financial instruments like stocks, bonds, derivatives, and currencies), risk management (e.g., risk assessment and management tools to monitor and mitigate risks across different financial activities), Customer Relationship Management (CRM) (e.g., functionalities that manage client interactions, track customer preferences, and personalize services), data analytics and reporting (e.g., capabilities that derive insights from large volumes of financial data), compliance and regulatory requirements (e.g., features to ensure compliance with various financial regulations and standards), mobile and online banking (e.g., mobile applications and online banking portals).

In some embodiments, the system receives the first request may comprise receiving, at a platform management application, a user request to perform a first off-chain action. The system may then determine that the first blockchain action corresponds to first off-chain action. For example, a user may initiate a request for a specific action that needs to be performed off-chain. This request could come through a user interface, API call, or any other user interaction method supported by the platform. The user request is received by the system and routed to a platform management application that serves as the central control or coordination point for managing various actions within the system. The platform management application analyzes the received user request and identifies the nature of the action requested. It parses and understands the details of the requested off-chain action, such as its purpose, parameters, and requirements. The system, through its logic or predefined mapping rules, identifies that the requested off-chain action has a corresponding action or operation that needs to be executed on the blockchain. This mapping could be based on predetermined correlations between off-chain and on-chain actions within the system's architecture or business logic.

The platform management application may validate the user request, ensuring it meets necessary criteria, security checks, and any required authorizations before proceeding further. Upon recognizing the corresponding blockchain action linked to the off-chain request, the system prepares the necessary data, parameters, or transaction details (e.g., other resources involved in the blockchain action) required to execute the corresponding action on the blockchain. For example, the system may receive a first user request to perform a first off-chain action determining that the first blockchain action corresponds to a second resource (e.g., a transaction from a first resource to a second resource).

Using appropriate mechanisms or interfaces (e.g., one or more self-executing programs, APIs, etc.), the platform management application triggers the execution of the determined blockchain action that aligns with the requested off-chain action. The prepared blockchain action is broadcasted to the blockchain network, initiating the process of validating, processing, and confirming the action by network nodes or validators. Validators in the blockchain network process the transaction, execute the action according to the defined logic, and include the validated transaction in a block. Once confirmed and added to the blockchain, the action is considered completed on-chain. The platform management application updates the status of the user request, providing feedback or notifications to the user about the successful execution of the requested action, whether it is off-chain or on-chain.

System 100 (e.g., using a platform application) may facilitate the performance of an off-chain action. As described herein, an "off-chain action" may refer to any activity or transaction that occurs outside the underlying blockchain network or protocol. Off-chain actions can take various forms, including off-chain transactions. These are transactions that occur outside the main blockchain network. They are conducted through secondary layers or channels and are settled or reconciled on-chain later. This helps in reducing congestion on the main chain and lowering transaction fees. Off-chain actions may also comprise off-chain computations. For example, complex computations or operations that are computationally expensive can be performed off-chain. For instance, in decentralized applications (DApps), certain computations or processes might be handled off-chain to improve performance and reduce latency, with only the final outcome or necessary data being recorded on the blockchain.

In some embodiments, off-chain actions may also comprise state channels and/or sidechains. For example, these are off-chain scaling solutions that enable parties to conduct transactions or execute smart contracts off the main chain. State channels allow participants to interact directly with each other off-chain, updating the state between them, while sidechains are separate blockchains that can be connected to the main blockchain, facilitating faster and more scalable transactions.

In some embodiments, off-chain actions may also comprise off-chain data storage. For example, storing large amounts of data directly on a blockchain can be inefficient and costly. Off-chain data storage solutions, such as decentralized storage networks (e.g., IPFS, Filecoin), enable the storage of data off-chain while maintaining references or proofs of the data's existence or integrity on the blockchain.

In some embodiments, an off-chain action (or result thereof) may refer to any data, information, or transactional details that are stored, processed, or maintained outside of the primary blockchain network. In blockchain technology, off-chain records exist separately from the main distributed ledger or blockchain itself. For example, an off-chain record may comprise a user bank account and/or other account linked to a user and/or other entity.

To facilitate the off-chain action, system 100 may use one or more on-chain actions related to network 110. Network 110 may comprise a blockchain. As described herein, a blockchain is a decentralized ledger of transactions built upon a combination of cryptography techniques (e.g., secret-keys, hash functions, etc.), consensus mechanisms (e.g., Proof of Work, Proof of Stake, etc.), and computer networks (e.g., peer-to-peer ("P2P") networks, the Internet, etc.). The blockchain stores information electronically, grouped together into a series of subsets of the information, called "blocks." The information may be maintained by a network of computers using cryptography and consensus mechanisms, which make the records difficult to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology has become a foundation of many decentralized applications.

For example, network 110 may comprise a digital log. A digital log may comprise a record or file that captures and stores a chronological sequence of events, actions, or transactions in a digital format. These logs serve various purposes across different domains, including information technology, cybersecurity, finance, and more. Digital logs may maintain a time-sequenced record of activities, events, or changes. Each entry in the log file typically includes a timestamp indicating when the event occurred. The digital log may contain specific details about the events or actions being logged. This information could include user activities, system events, errors, security-related events, transactions, or changes in configurations. Digital logs can be stored in various formats, including text files, structured databases, JSON, XML, or other formats that suit the specific requirements of the system or application generating the logs. The digital logs may be used for diagnosing issues, troubleshooting problems, monitoring system performance, conducting forensic analysis, and auditing activities. They serve as a historical record for understanding past actions or incidents.

In some embodiments, the digital log may comprise a distributed ledger (e.g., for a blockchain) and/or other index of blockchain data. For example, the distributed ledger may be a type of database or digital ledger that exists across multiple locations or nodes within a decentralized network. It records transactions, contracts, or any form of data in a secure, transparent, and tamper-evident manner without the need for a central authority or intermediary. Unlike traditional centralized ledgers, distributed ledgers are not controlled by a single entity. Instead, they are distributed among multiple participants or nodes in a network, each maintaining an identical copy of the ledger. This decentralization increases transparency and resiliency by eliminating a single point of control or failure. Distributed Ledgers use consensus mechanisms among network participants to validate and agree upon the state of the ledger. Consensus protocols ensure that all copies of the ledger across the network are in sync and agree on the validity of transactions, maintaining a consistent record of data. Once information is added to the ledger, it becomes virtually immutable, meaning it cannot be altered or deleted retroactively without consensus from the network. The use of cryptographic techniques ensures the security and integrity of the data stored on the ledger.

Network 110 may be used by system 100 to manage and/or facilitate one or more cryptographically secure digital assets (e.g., asset 108). A cryptographically secure digital asset may comprise a tokenization of a value or asset (e.g., a tokenized bank deposit). For example, a cryptographically secure digital asset refers to a digital representation of value, ownership, and/or rights that is secured by cryptographic techniques, ensuring its integrity, authenticity, and/or protection against unauthorized access or modification. These assets exist in digital form and rely on cryptographic protocols and technologies for their security and verification. For example, the asset's security may be based on cryptographic algorithms and techniques that provide strong encryption, hashing, digital signatures, and other cryptographic mechanisms to protect its data and transactions. The cryptographically secure digital assets may operate on blockchain networks. Blockchains use decentralized and distributed ledger technology, ensuring tamper-proof records of transactions and asset ownership. Transactions involving these assets are recorded on a blockchain, creating an immutable and transparent history of ownership and transactional history. Once recorded, data on the blockchain cannot be altered retroactively without consensus from the network. Cryptographically secure digital assets allow ownership and transfer of value or rights in a decentralized manner. Users can securely transfer ownership or conduct transactions directly without relying on intermediaries. Users may access and manage these assets using cryptographic keys. Public and private keys allow users to securely interact with the assets, sign transactions, and prove ownership without revealing sensitive information.

Network 110 may be used to facilitate communications (e.g., blockchain actions) irrespective of whether a resource is on-line. For example, a resource in a network may be "online," whether it is a device, service, and/or application, when it is currently connected and available for communication and interaction within the network. In contrast, a resource may be off-line when it is not on-line. For example, the term "online" signifies that the resource is active, operational, and accessible to other devices or users in the network. Being online implies that the resource is powered on, connected to the network infrastructure (such as the internet or a local network), and ready to send, receive, or process data, requests, or commands.

For example, a computer, server, printer, or any network-connected device is considered online when it is powered up, connected to the network (via Ethernet or Wi-Fi), and ready to send and receive data. In another example, applications, websites, or cloud-based services may be online when their servers are operational, connected to the internet, and available for users to access or utilize their functionalities. In yet another example, being online indicates that the resource is reachable and responsive to requests or communication attempts from other devices or users on the network. For example, in embodiments, in which the resource is a bank account, bank branch, etc. the resource may be on-line when the resource (or assets held by the resource) are reachable and responsive to requests or communication attempts from other devices or users on the network.

In some embodiments, system 100 may be used to manage resources across network 110. For example, system 100 may manage resources based on the availability of resources in network 110. In some embodiments, availability may comprise resource availability. Resource availability in a computer network may refer to the accessibility and readiness of various network resources, devices, services, or applications for use by authorized users or other components within the network. It signifies the ability of these resources to fulfill requests, process data, or perform tasks effectively and efficiently when required. For example, availability may correspond to device accessibility (e.g., the ability of devices (such as computers, servers, routers, switches, printers, etc.) to be reachable and responsive on the network), service uptime (e.g., time services remain operational and responsive to user requests), bandwidth and performance (e.g., resources promptly accessing and/or delivering data or services efficiently without delays or bottlenecks), data and information access (e.g., availability of data resources, databases, files, and information required by users or applications within the network).

In some embodiments, availability may correspond to liquidity. Liquidity refers to the ability of a bank or financial institution to meet its short-term obligations and fund its day-to-day operations efficiently. It represents the availability of liquid assets that can be quickly converted into cash to cover liabilities, withdrawals, or unexpected demands for funds. Banks maintain liquidity primarily through liquid assets such as cash, reserves held at central banks, short-term government securities, highly marketable securities, and other instruments that can be easily sold or converted into cash without significant loss of value. Banks may engage in asset-liability management to balance their assets and liabilities, ensuring that they have sufficient liquid assets to cover liabilities and maintain a healthy liquidity position.

In some embodiments, the system may determine one or more characteristics of availability in one or more resources. The system may then select a cryptographically secure digital asset, from a plurality of cryptographically secure digital assets, based on the characteristics. In some embodiments, the system may determine one or more characteristics of availability in one or more resources. The system may then select a cryptographically secure digital asset, from a plurality of cryptographically secure digital assets, based on the characteristics. For example, the system (or self-executing program) may determine a condition for performing the first blockchain action and select a first cryptographically secure digital asset, from a plurality of cryptographically secure digital assets, based on the condition. For example, the condition may indicate a requirement for a cryptographically secure digital asset as recorded in a predetermined digital log corresponding to the first resource. For example, the self-executing program condition may determine a requirement for a first cryptographically secure digital asset, as recorded in a predetermined digital log corresponding to a resource, involves encoding specific criteria or rules within the smart contract's code to validate the possession or existence of the digital asset before executing certain actions or operations. For example, developers encode conditions within the self-executing program's code using a programming language suitable for smart contracts (e.g., Solidity for Ethereum). These conditions define the rules or requirements that need to be met regarding the possession or existence of the cryptographically secure digital asset. The self-executing program may interact with a predetermined digital log or ledger that records information related to resources. The condition within the contract checks this log to verify the presence or ownership of the specific digital asset corresponding to the resource. The condition may specify requirements such as verifying the ownership of the digital asset through cryptographic keys, checking the asset's unique identifier or token ID, validating a specific transaction or event recorded in the digital log related to the asset, or confirming its existence in a specific state. When a user initiates an action or transaction involving the resource within the self-executing program, the condition is evaluated. If the condition verifies the possession or existence of the required cryptographically secure digital asset in the predetermined digital log, the self-executing program proceeds with the intended operation or execution.

As described herein, a characteristic of availability may comprise any attribute that distinguishes the availability (or availability on a resource) from other availability (or availability on another resource). In some embodiments, characteristics of availability in resources within a computer network may refer to attributes or factors that define the accessibility, reliability, and continuity of these resources. For example, a characteristic may refer to uptime and reliability as availability is associated with the ability of resources to remain operational and accessible over time without unexpected interruptions. High availability implies minimal downtime and consistent reliability.

In another example, a characteristic may refer to accessibility. Available resources should be easily accessible and reachable by users or systems when needed. This includes factors such as network connectivity, response time, and the absence of barriers preventing access. In another example, a characteristic may refer to redundancy and fault tolerance. Systems designed with redundancy have backup mechanisms or duplicate resources to ensure continuous operation even if one component fails. Fault-tolerant systems can detect and recover from failures without significant impact on availability. In another example, a characteristic may refer to resilience to failures. Availability may be linked to a system's resilience against failures caused by hardware malfunctions, software errors, network issues, or other disruptions. Systems designed for high availability can withstand failures and maintain functionality. In another example, a characteristic may refer to scalability and capacity planning. Availability considerations involve the ability to scale resources to meet increasing demand without compromising performance or accessibility. Proper capacity planning ensures resources are available as needed. In another example, a characteristic may refer to monitoring and maintenance. Continuous monitoring, proactive maintenance, and timely interventions play a crucial role in ensuring resource availability. Monitoring tools help detect issues early, allowing for prompt resolution and minimizing downtime. In another example, a characteristic may refer to recovery and disaster preparedness. Availability includes having recovery strategies and disaster preparedness plans in place. These plans help restore services quickly after unexpected events, such as natural disasters or cyber-attacks. In another example, a characteristic may refer to service level agreements (SLAs) characteristics. Defining and adhering to SLAs regarding availability metrics, such as uptime percentage, response time, and maintenance windows, is essential in ensuring commitments to users or customers.

In another example, a characteristic may refer to geographical distribution and load balancing. Distribution of resources across multiple geographical locations and load balancing techniques contribute to availability by ensuring even distribution of workload and minimizing the impact of localized disruptions. In another example, a characteristic may refer to security measures. Availability is linked to security practices that protect resources from unauthorized access, cyber threats, or malicious attacks. Security measures prevent service disruptions caused by security breaches. In another example, a characteristic may refer to documentation and recovery procedures. Maintaining comprehensive documentation and well-defined recovery procedures helps restore services efficiently in case of outages or failures, minimizing the impact on availability.

In some embodiments, a characteristic of availability may refer to a characteristic of a good, service, and/or medium of exchange (e.g., money). The characteristics of currency, which is issued by governments and central banks. For example, a characteristic may refer to an issuing authority (e.g., a recognized government or central monetary authority within a country), legal tender (e.g., whether it is authorized by the government for settling debts, transactions, and payments within the country's borders), denomination and/ or amount, physical form (e.g., banknotes and coins), type (e.g., fiat, commodity-backed), security features, exchange rate, stability, regulation, etc.

Selecting a cryptographically secure digital asset from a plurality of such assets based on characteristics involves a process that considers various attributes or features associated with these assets. The system may identify the specific characteristics or attributes that are essential for the system's purpose or requirements. These criteria could include factors such as security features, transaction speed, scalability, decentralization, consensus mechanism, token standard (e.g., ERC-20, ERC-721), utility, or network adoption. The system may obtain information and data about the plurality of cryptographically secure digital assets under consideration. This information may include technical specifications, whitepapers, historical performance, market data, developer community, security audits, and use case relevance. The system may evaluate and compare the characteristics of each digital asset against the predefined selection criteria. Assess how well each asset aligns with the system's requirements, considering factors like security, functionality, transaction costs, liquidity, governance, or regulatory compliance. The system may apply a weighted scoring system or ranking mechanism to assign importance or priority to different characteristics based on their relevance to the system's goals. For example, security might have higher weightage compared to transaction speed. The system may conduct both quantitative analysis (e.g., metrics, performance data) and qualitative analysis (e.g., community support, development activity) to comprehensively assess the assets' characteristics. In some embodiments, the system may employ decision models or algorithms that factor in the weighted criteria and analysis to generate a scoring system or rank the assets based on their suitability for the system's requirements.

Figure 1B:
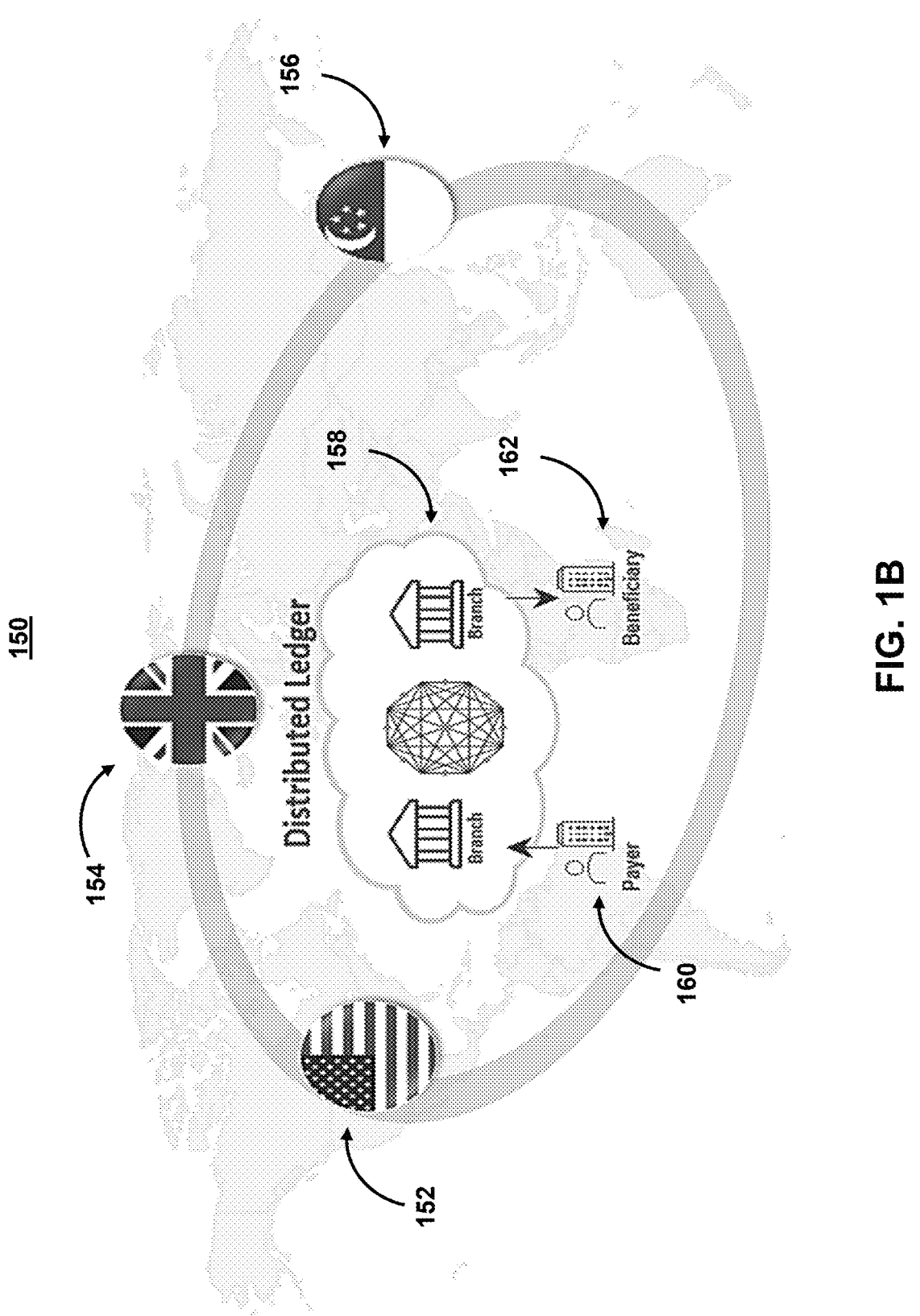
FIG. 1B shows an illustrative diagram for managing resources across global or cloud networks, in accordance with one or more embodiments.

FIG. 1B shows an illustrative diagram for managing resources across global or cloud networks, in accordance with one or more embodiments. For example, as shown in FIG. 1B, system 150 may for managing resources across global or cloud networks while mitigating issues related to providing services while resources are off-line. System 150 may use the architecture described in FIG. 1A (e.g., system 100) to manage these resources. For example, system 150 may reflect that application of system 100 (FIG. 1A) to the exchange of money, assets, and/or financial instruments between parties located in different countries or jurisdictions. These transactions involve the movement of funds or financial instruments across international borders and are conducted through various channels within the global financial system. International transactions can be complicated by the closure of local bank branches due regulatory issues related to conducting transactions after hours (e.g., when a bank branch is off-line). This could delay the processing of transactions or create difficulties in meeting regulatory requirements. System 150 (e.g., via system 100 (FIG. 1A)) may overcome these difficulties using a series of networks.

For example, system 150 may illustrate a transaction occurring from a bank branch (or account) located in jurisdiction 152 and jurisdiction 156, which may also involve jurisdiction 154. In particular, system 150 may illustrate how the availability of liquidity is used to conduct international transactions. For example, banks use liquidity as a crucial factor in facilitating international transactions. Liquidity, in the context of banking, refers to the availability of funds or assets that a bank holds to meet its financial obligations, including processing transactions. Banks use their liquidity to provide funding for international transactions, including trade finance, cross-border payments, letters of credit, and other financial services required by businesses or individuals engaged in global trade. Banks use liquidity to settle cross-border payments on behalf of their customers. Adequate liquidity enables banks to convert and transfer currencies, ensuring timely and smooth international payments between parties in different countries.

For example, the system may determine, using one or more self-executing programs, a first actual availability (e.g., liquidity) for a first resource (e.g., a first user account and/or bank branch) in a first computer network (e.g., financial services network), wherein the first resource is currently on-line (e.g., the branch is currently open), and wherein the first actual availability is represented by a first cryptographically secure digital asset in a digital log (e.g., digital log 158).

In some embodiments, the system may determine a synthetic liquidity for a resource that is off-line. Synthetic availability (e.g., liquidity) may refer to availability (e.g., liquidity) that is artificially created or enhanced through instruments, strategies, mechanisms, and/or the use of tokenized digital assets. For example, rather than relying solely on traditional liquid assets or actually determined availability, the system may use synthetic availability as a placeholder. The system may determine, using the one or more self-executing programs, a first synthetic availability (e.g., liquidity) for a second resource (e.g., a second user account and/or bank branch) in the first computer network, wherein the second resource is currently off-line (e.g., the bank branch is closed), and wherein the first synthetic availability is represented by a second cryptographically secure digital asset in the digital log.

The system may determine a first aggregate availability (e.g., a global liquidity for the financial services firm) in the digital log for the first computer network based on the first cryptographically secure digital asset and the second cryptographically secure digital asset. The aggregate availability of resources in a computer network may refer to the collective or overall availability of various resources, devices, services, or applications within the network. It represents the combined availability status of multiple individual resources, considering their availability, readiness, and operational status as a whole. To determine the aggregate availability, the system may consider the availability of all network resources as a whole, including devices (such as servers, routers, switches, etc.), services (such as web servers, databases, email servers), applications, and other critical components within the network. Aggregate availability may provide a comprehensive view of the network's health by assessing the combined readiness and accessibility of multiple resources. It may take into account the interdependencies among various resources and their impact on the network's overall functionality.

In some embodiments, the aggregate availability may correspond to aggregate liquidity. Aggregate liquidity may refer to the overall or combined level of liquidity available to meet a bank or other entities funding needs and obligations across its various assets, liabilities, and off-balance-sheet exposures. It represents the collective liquidity position of the entity, considering all its sources of liquidity and the ability to withstand liquidity stress or funding challenges. It considers the total availability of liquid assets, funding sources, and contingent funding facilities that the bank can access to meet its short-term and long-term liquidity requirements.

The system may receive a first request (e.g., a request from a platform application to facilitate an action from payer 160 to beneficiary 162) to perform a first blockchain action, wherein the first blockchain action requests access to the second resource. A request (e.g., a computer request) may refer to a communication or a query made by a computer or a software application to another computer, server, and/or device on a network. This request is typically initiated by a client computer seeking specific information, data, resources, or services from a server or another computing device. Computer requests can take various forms depending on the nature of the interaction and the protocols used. For example, in web-based applications, computers often make HTTP (Hypertext Transfer Protocol) requests to web servers. These requests are sent when a user accesses a website, submits a form, or requests data from an API (Application Programming Interface). In another example, computers within a network communicate by sending requests and receiving responses. This could include file transfer requests, database queries, or any form of data exchange between devices on the network. Software applications often interact with external services or APIs to fetch or send data. API requests are made by the client application to the server hosting the API, specifying the desired action or information needed. In distributed computing environments, Remote Procedure Calls (RPCs) are requests made by one program to execute a procedure or function on another remote system, and then receiving the result. When a computer needs to resolve a domain name into an IP address, it sends a Domain Name System (DNS) request to a DNS server, asking for the IP address associated with a specific domain name.

The system may process the first blockchain action using the first aggregate availability. The system may process the first blockchain action using the first aggregate availability. For example, the system may use a privately permissioned blockchain network to enable real-time settlement between bank branches irrespective of whether branches are on-line. The system may process the blockchain action using the aggregate availability (or liquidity). For example, the system may process a blockchain action using aggregate liquidity involves leveraging the available liquidity resources within a blockchain network to facilitate transactions, ensure sufficient funds to fulfill obligations, and manage liquidity requirements effectively. For example, the system may aggregate liquidity within a blockchain network by combining availability of liquid assets, tokens, or cryptocurrencies held by participants, decentralized finance (DeFi) protocols, liquidity pools, and/or self-executing programs within the blockchain ecosystem. When a user initiates a transaction on the blockchain network (such as transferring tokens or executing a smart contract), the system assesses the liquidity requirements for that action. The system checks the aggregate liquidity available within the network. It may involve querying decentralized exchanges (DEXs), liquidity pools, or smart contracts to determine the availability of required tokens or assets. In some embodiments, liquidity may be pooled into account pools, device (or regional) pools, and/or decentralized liquidity pools. The system may then utilize these pools to source tokens or assets required for the transaction, ensuring sufficient liquidity to execute the action despite one or more resources being on or off-line.

The system may determine a second aggregate availability for the first computer network following the first blockchain action. In some embodiments, the system may balance the digital log (or other ledger) to reflect the actual availability (or liquidity) of a resource. For example, balancing a ledger of resource availability after using availability for a resource to conduct an action for another involves maintaining accurate records of resource availability transactions to ensure that the ledger reflects the changes made due to these actions. This process can be applied in various contexts, including accounting, resource management, or transactional systems within a computer network.

For example, the ledger may start with a record of the initial availability of resources (e.g., whether recorded as actual or synthetic availability). This could include details such as quantities, types, or states of available resources within the system or network. When a resource is used to conduct an action for another resource or entity, the system records this transaction in the ledger. It deducts or adjusts the availability of the utilized resource accordingly. The action is executed or performed using the utilized resource, fulfilling the intended purpose or transaction. This could involve processes like transferring resources, completing a task, providing a service, or facilitating a transaction. The system updates the ledger to reflect the utilization of the resource for the conducted action. It records the details of the transaction, including the specific resource utilized, the action conducted, quantities involved, timestamps, and any relevant metadata. After the action is completed and the ledger is updated, the system ensures that the total availability of resources is accurately reflected in the ledger. It reconciles the ledger entries to confirm that the total resources available match the sum of initial availability minus the utilized resources for conducted actions. The system verifies the ledger entries to ensure accuracy and consistency. It reconciles any discrepancies, verifies the integrity of the recorded transactions, and performs audits if necessary to confirm the correctness of resource availability records. The system continuously maintains and updates the ledger as resource transactions occur. It monitors resource utilization, updates availability records for each action, and ensures the ledger accurately represents the current availability of resources within the system or network.

The system may determine, using the one or more self-executing programs, a second synthetic availability for the second resource following the first blockchain action. The system may determine that the second resource is now on-line. The system may then replace, using the one or more self-executing programs, the second synthetic availability with second actual availability in the digital log. For example, replacing synthetic availability represented by digital assets with actual availability represented by detected availability in a digital log involves transitioning from a theoretical or assumed state of availability (synthetic availability) to the real-time, observed, or measured state of availability (actual availability) of resources or assets within a system. To do so, the system may establish metrics and parameters that determine synthetic availability based on digital assets or assumptions. For instance, synthetic availability might be calculated based on planned uptime, theoretical performance, or assumed availability of resources. The system may deploy monitoring systems, sensors, or tools within the network infrastructure to continuously observe and detect the actual availability of resources. These monitoring systems can track various aspects such as device uptime, response times, network connectivity, service status, etc. The system may continuously collect real-time data and performance metrics from the monitoring systems. This data provides insights into the actual operational status and availability of resources within the network. The system may compare the synthetic availability, which is derived from digital assets or assumptions, with the actual availability detected and recorded by the monitoring systems. The system may identify discrepancies or differences between the two states (e.g., as resource go on and off-line). The system may replace or update entries in the digital log that represent synthetic availability with the actual availability detected by the monitoring systems. The system may record the observed availability, downtime, incidents, or performance metrics accurately in the log entries. The system may implement automated reporting or alerting mechanisms that trigger notifications or reports whenever the detected availability deviates significantly from the synthetic availability or predefined thresholds.

Figure 2:
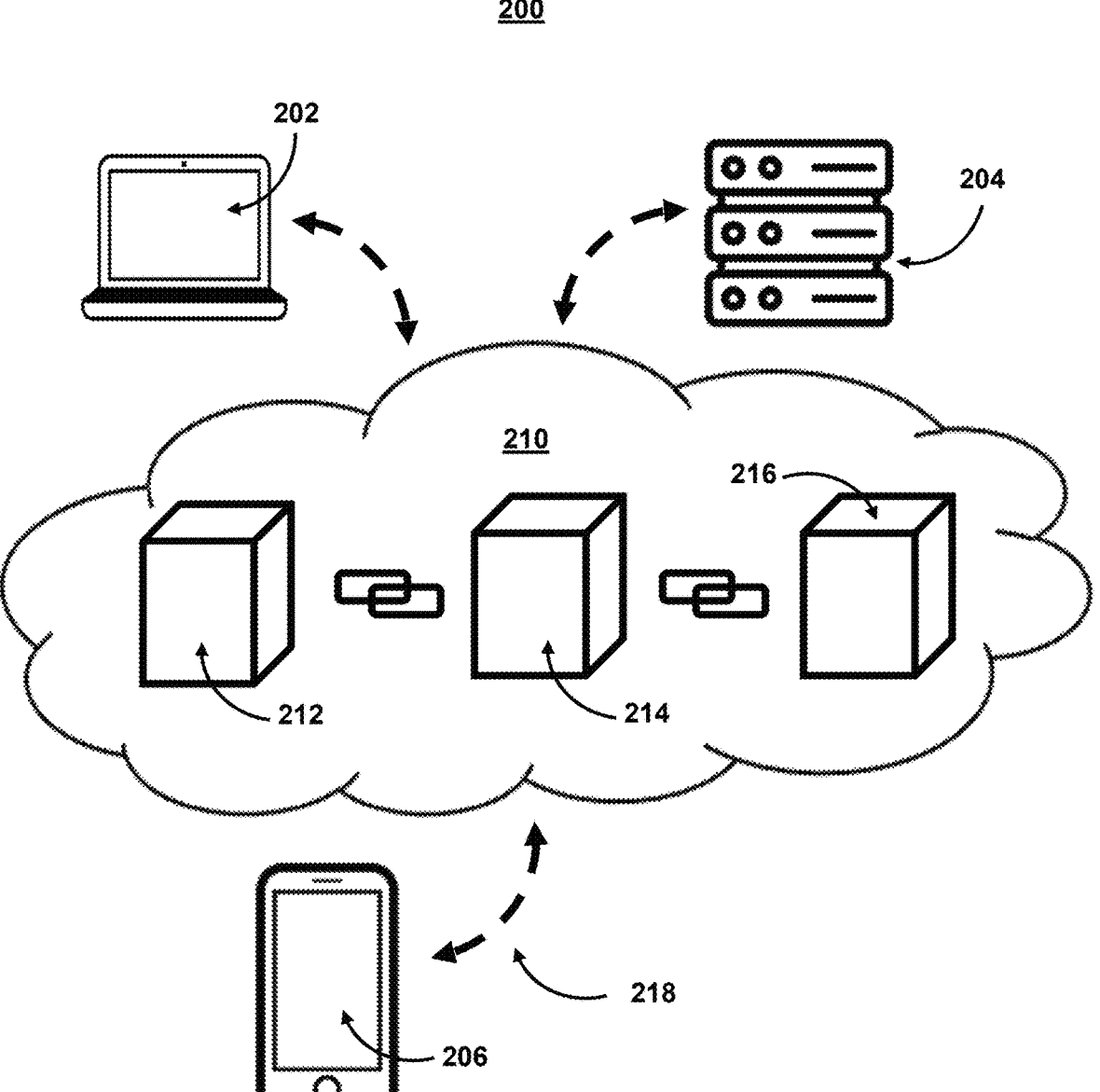
FIG. 2 shows an illustrative diagram of a blockchain network, in accordance with one or more embodiments.

FIG. 2 shows an illustrative diagram of a blockchain network, in accordance with one or more embodiments. For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more client, which behaves like an actual computer) for the system. The data structure may comprise one or more devices and/or components, which may act in concert to facilitate blockchain 210.

As referred to herein, blockchain 210 may comprise a type of distributed ledger technology that consists of growing list of records, called blocks (e.g., block 212, block 214, and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214, but also block 212). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components (e.g., user device 204 and user device 206, respectively). Additionally, or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions).

Additionally, the devices in system 200 may run an application (or another suitable program). The application may cause the processors and/or control circuitry to perform operations related to managing resources across global or cloud networks using a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes network 218, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
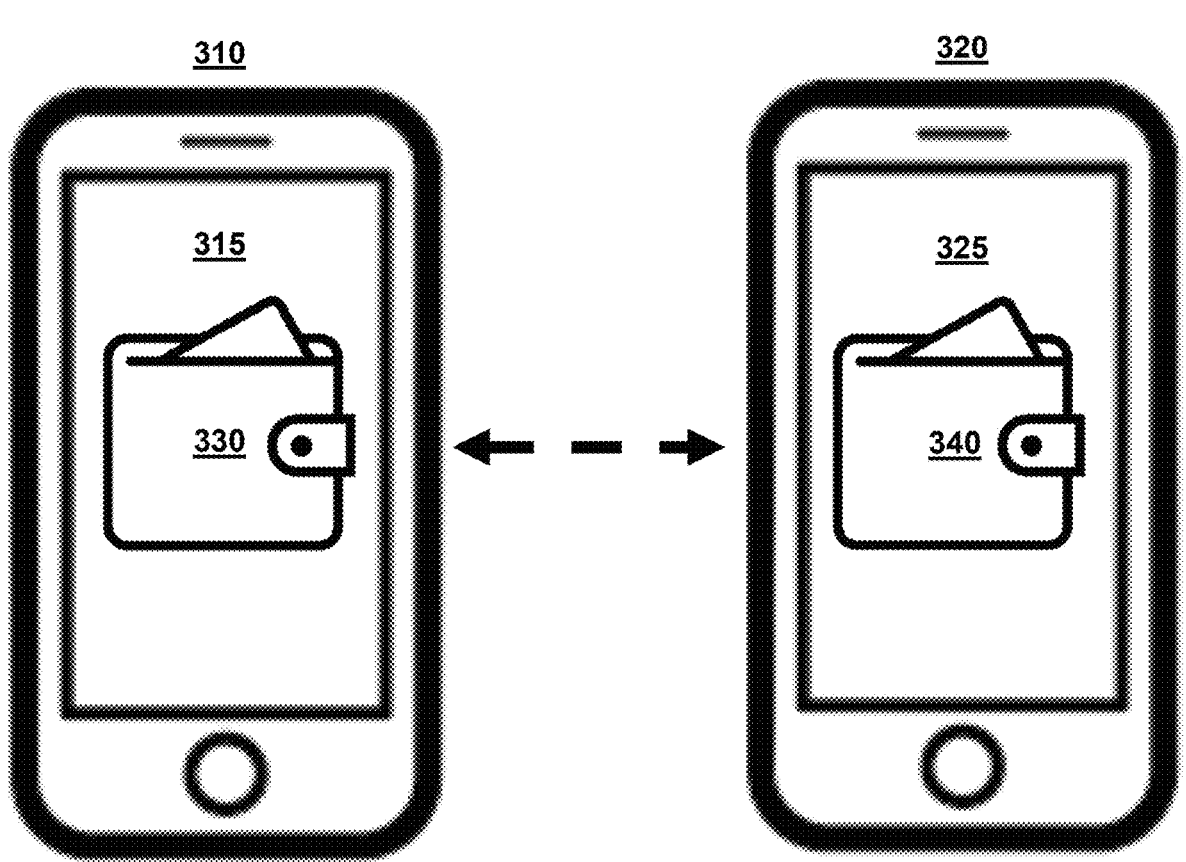
FIG. 3 shows an illustrative diagram for performing a blockchain action, in accordance with one or more embodiments.

FIG. 3 shows an illustrative diagram for conducting blockchain actions, in accordance with one or more embodiments. For example, the diagram presents various components that may be used to manage resources across global or cloud networks in some embodiments.

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some embodiments, a blockchain action may comprise the creation, modification, detection, and/or execution of a smart contract or program stored on a blockchain. For example, a smart contract may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

FIG. 3 includes system 300, which includes user device 310 and user device 320, although other devices and/or components may also be featured in system 300 (e.g., one or more of devices and/or components shown in FIG. 2). User device 310 includes user interface 315. User device 320 includes user interface 325. As referred to herein, a "user interface" may comprise a mechanism for human-computer interaction and communication in a device and may include display screens, keyboards, a mouse, and the appearance of a desktop. For example, a user interface may comprise a way for a user interact with and/or access an application, website, and/or other program in order to manage resources across global or cloud networks. A user interface may display content related to blockchain actions. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

In some embodiments, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3, one or more user devices may include a cryptography-based, storage application (e.g., cryptography-based, storage application 330 and cryptography-based, storage application 340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some embodiments, the cryptography-based, storage application may comprise and/or be compatible with one or more application program interfaces (e.g., APIs). For example, an API may be implemented on user device 310 and/or communicate with an API implemented on user device 320. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate blockchain actions. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDOS) attacks. The API may use RESTful APIs as standard for external integration.

In some embodiments, the system may also use one or more Application Binary Interfaces (ABIs) and an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower-level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some embodiments, the cryptography-based, storage application may correspond to a key-based wallet or a smart contract wallet. For example, a key based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiment, a cryptography-based, storage application may include, or have access to, key-based wallet or a smart contract wallet. For example, the cryptography-based, storage application may comprise a digital or other construct (e.g., a reference, a pointer, a text on a blockchain, an address, etc.).

In some embodiments, to conduct a blockchain action, user device 310, user interface 315, and/or cryptography-based, storage application 330) may comprise, control, and/or have access to a private key and/or digital signature. For example, system 300 may use cryptographic systems for conducting blockchain actions such as managing the availability of resources. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain 210 (FIG. 2)), and the blockchain action is completed. For example, to add the blockchain action to blockchain, the successful node (e.g., the successful miner) encapsulates the blockchain action in a new block before transmitting the block throughout system 300.

In some embodiments, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 330) may allow a user device (e.g., user device 310) to share files, access, and/or perform a blockchain action with another user device (e.g., user device 320) and/or cryptography-based, storage application (e.g., cryptography-based, storage application 340). For example, the peer-to-peer architecture and decentralized nature allows blockchain actions to be conducted between the user devices, without the need of any intermediaries or central authorities.

FIG. 4 shows a flowchart of the steps involved in managing resources across global or cloud networks, in accordance with one or more embodiments. For example, the system may use process 400 (e.g., as implemented on one or more system components described above) in order to manage resources across global or cloud networks while mitigating issues related to providing services while resources are off-line.

At step 402, process 400 (e.g., using one or more components described above) determine an actual availability for a first resource in a computer network. For example, the system may determine, using a first self-executing program, a first actual availability for a first resource in a first computer network, wherein the first resource is currently on-line, and wherein the first actual availability is represented by a first cryptographically secure digital asset in a digital log.

In some embodiments, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.) within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

At step 404, process 400 (e.g., using one or more components described above) determine a synthetic availability for a second resource in the computer network. For example, the system may determine, using a second self-executing program, a first synthetic availability for a second resource in the first computer network, wherein the second resource is currently off-line, and wherein the first synthetic availability is represented by a second cryptographically secure digital asset in a digital log.

In some embodiments, determining the first synthetic availability for the second resource in the first computer network may comprise the system retrieving a last known actual availability for the second resource from the digital log and selecting the first synthetic availability from a plurality of synthetic availabilities, based on the last known actual availability. For example, the system may access the digital log, which records historical actual availability data for the resource in the computer network. The system may retrieve the most recent or last known actual availability value recorded in the log. The system may use multiple synthetic availability models or algorithms exist to forecast or estimate availability based on different factors, such as historical patterns, statistical analysis, predictive models, or machine learning algorithms. These models may generate synthetic availability values that represent predicted or simulated availability for the resource. The system may employ a selection process that compares the last known actual availability retrieved from the digital log with the various synthetic availability values generated by different models. The comparison may involve evaluating the deviation or similarity between the last known actual availability and each synthetic availability model. Criteria for comparison may include statistical measures, error rates, similarity indices, or thresholds that determine which synthetic availability value is most aligned or accurate relative to the last known actual availability. Based on the comparison criteria, the system selects the synthetic availability value from the plurality of synthetic availabilities that best matches or correlates with the last known actual availability obtained from the digital log. The system may utilize the chosen synthetic availability value as a representation or estimation of the resource's availability for future planning, decision-making, or system operations. It may integrate this synthetic availability value into algorithms, monitoring systems, or resource allocation strategies within the computer network. The system may continuously refines or updates the synthetic availability selection process based on new actual availability data recorded in the digital log, improving the accuracy and reliability of synthetic availability estimations over time.

At step 406, process 400 (e.g., using one or more components described above) determine an aggregate availability for the first computer network based on the first synthetic availability and the first synthetic availability. For example, the system may determine a first aggregate availability for the first computer network based on the first actual availability and the first synthetic availability.

In some embodiments, determining the first aggregate availability for the first computer network based on the first actual availability and the first synthetic availability may comprise the system aggregating the first cryptographically secure digital asset and the second cryptographically secure digital asset and determining the first aggregate availability based on aggregating the first cryptographically secure digital asset and the second cryptographically secure digital asset. For example, the system may system gather or calculate the real-time or historical availability of resources using actual data obtained from monitoring systems or logs. The system may also determine a last known amount of availability at an off-line resource. Alternatively or additionally, the system may derive synthetic availability from predictive models, statistical analysis, and/or other algorithms that forecast or estimate resource availability based on historical patterns, trends, and/or predictive factors. The system may consider two cryptographically secure digital assets as indicators of availability. Each asset's value may represent the availability status or a weighted measure reflecting the degree of availability for the corresponding resource. For instance, the first asset's value might represent the actual percentage availability, while the second asset's value signifies a predicted or estimated availability measure. The system may combine or aggregate the values of the two assets (actual and synthetic) to determine the aggregate availability. The system may use mathematical operations (such as addition, averaging, weighted aggregation, or other algorithms) to combine these values and calculate an overall representation of aggregate availability. The system may use the significance or reliability attributed to each asset's availability representation. The system may apply different weights or proportions during aggregation to prioritize one token's influence over the other in determining the aggregate availability. Based on the calculated aggregate availability value, the system assesses whether the network's overall availability meets predefined thresholds, requirements, or criteria for optimal functioning or desired operational levels. If the aggregate availability meets desired criteria, the system may proceed with resource allocation, task execution, or decision-making based on the assessed availability. In case the aggregate availability falls below acceptable levels, the system may trigger contingency plans, alternative resource utilization, or alert mechanisms to mitigate potential risks or issues.

At step 408, process 400 (e.g., using one or more components described above) receive a request for an action. For example, the system may receive a first request to perform a first blockchain action across the first computer network. In some embodiments, the system may receive the first request to perform the first blockchain action across the first computer network may comprise a system determining that the first blockchain action requests access to the second resource and determining to use the first actual availability to process the first blockchain action.

For example, the process of receiving a request to perform a blockchain action across a computer network involves assessing the action's requirements, including access to resources, and making decisions based on the availability of those resources. The system may receive a request to execute a blockchain action across the computer network. This request may contain information about the action to be performed and the resources required for its execution. The system may examine the details of the blockchain action to identify the resources needed, including access to a second resource and potential dependencies on the availability of other resources. The system may assess the availability status of the required resources. The system may check the actual availability of the first resource (already known or retrievable from logs or real-time monitoring systems) that might be involved in processing the blockchain action. Upon evaluating the actual availability of the first resource, the system may make a determination whether to proceed with using this available resource to process the blockchain action that requests access to the second resource. If the system decides to use the actual availability of the first resource, the system may initiate the processing of the blockchain action, leveraging the available resource to fulfill the action's requirements. Throughout this process, the system maintains logs or records of resource availability, actions performed, decisions made based on resource availability, and the outcome of the blockchain action execution.

In case the first resource's availability changes or if there are unexpected issues during execution, the system may have predefined error-handling mechanisms or contingency plans to manage such situations. The system may continue to monitor for whether a resource is on-line or off-line. For example, the system may determine that the second resource is now on-line and replace, using a fourth self-executing program, the first synthetic availability with a second actual availability in the digital log. Additionally or alternatively, the system may determine that the first resource is now off-line and replace, using a fifth self-executing program, the first actual availability with a second synthetic availability in the digital log. Upon completion of the blockchain action or decision-making process based on resource availability, the system may provide feedback, update status, or generate reports to relevant stakeholders regarding the action's execution and resource utilization.

In some embodiments, determining to use the first actual availability to process the first blockchain action may comprise the system determining that the second resource is off-line and, in response to determining that the second resource is off-line, determining to use the first aggregate availability to process the first blockchain action. For example, when a system determines that a second resource required for a blockchain action is offline, it can respond by using an aggregate availability derived from multiple other resources to process the blockchain action. To do so, the system may continually monitor the status of various resources, including the second resource necessary for the blockchain action. This monitoring could involve real-time checks, periodic pings, or status updates from network nodes or monitoring systems. The system may detect or receive information indicating that the second resource required for the blockchain action is offline or unavailable. This could be due to maintenance, technical issues, a bank branch being closed (e.g., in a financial services embodiment), and/or other reasons causing the resource to be temporarily inaccessible. Upon detecting the offline status of the second resource, the system may initiate a process to calculate an aggregate availability value. This involves assessing the availability status of a plurality of other resources within the network. The system may compute or aggregate the availability metrics, status, or capabilities of multiple other resources that are online and accessible. It combines this information to derive an aggregate availability value that represents the combined availability of these resources. Using the calculated aggregate availability value, the system may determine whether it is feasible or appropriate to use this combined availability of other resources to process the first blockchain action, compensating for the unavailability of the second resource. If the system determines that the aggregate availability of other resources is sufficient or adequate to handle the blockchain action, the system proceeds to execute the action using the collective capabilities of the available resources. During the execution, the system may dynamically allocate or redistribute availability, liquidity, tasks, load, and/or responsibilities among the available resources to ensure efficient processing of the blockchain action. While the action is being processed using the aggregate availability, the system continues to monitor resource status. It reassesses the situation to determine when the initially offline resource is back online and whether to adjust resource allocation accordingly. Throughout this process, the system maintains logs, records the decision-making process, resource availability details, and action execution outcomes. It may also generate reports or notifications to stakeholders regarding resource utilization and actions taken.

At step 410, process 400 (e.g., using one or more components described above) process the action using the aggregate availability. For example, the system may process the first blockchain action using the first aggregate availability. In some embodiments, the system may process the first blockchain action using the first aggregate availability by determining a second aggregate availability for the first computer network following the first blockchain action and determining, using a third self-executing program, a second synthetic availability for the second resource following the first blockchain action. For example, following a blockchain action the system may continuously monitor actual and synthetic availability, updates availability values for as needed, recalculate aggregate availability, and/or adjusts resource allocation or decision-making accordingly.

In some embodiments, processing the first blockchain action using the first aggregate availability may comprise the system determining an amount of availability needed to process the first blockchain action. The system may then use the first actual availability to process the first blockchain action. The system may then deduct the amount from the first synthetic availability to determine a second synthetic availability for the second resource. The system may then determine a third synthetic availability for the first resource corresponding to the amount. For example, system may evaluate the first blockchain action's requirements and determines the amount of availability needed from the resources involved in the action. The system may check the first actual availability, which represents the real-time availability status of the resources involved. It uses this actual availability to process the first blockchain action. After using the actual availability to process the action, the system deducts the amount of availability consumed or utilized from the first synthetic availability corresponding to the resource involved in the action. This deduction adjusts the synthetic availability value to reflect the portion of resources utilized for processing the first blockchain action. The system may recalculate or determine a third synthetic availability value specifically for the first resource based on the amount of availability consumed during the processing of the first blockchain action. This third synthetic availability represents the adjusted availability estimation for the first resource after accounting for the utilization in the processing of the action.

In some embodiments, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.) within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

In some embodiments, the first verification may be determined based on an amount for an off-chain record corresponding to the first resource, and the first verification may be received at a first blockchain network via a first oracle. For example, the system may interact with an oracle that has access to off-chain data, such as databases, APIs, or external systems, where the off-chain record corresponding to a specific resource is stored or updated. The system may define conditions or rules specifying that an on-chain action should occur based on certain parameters or data retrieved from the off-chain record. For instance, the condition could be a specific amount or value associated with the resource in the off-chain record. The system may use the oracle to query the off-chain data source and retrieve the relevant information or amount corresponding to the resource. The oracle fetches this data from the off-chain record. Upon receiving the data from the off-chain source, the system may validate and compare it against the predefined conditions or rules set for triggering the on-chain action. If the retrieved amount matches or meets the specified criteria, the validation process confirms that the condition is satisfied. Once the validation confirms that the condition based on the off-chain record's data is met (e.g., a party delivers a good at issue in a transaction, a party paid for a good, a network connection is created, appropriate availability/liquidity is found, etc.), the system triggers the corresponding on-chain action or smart contract function. This action could involve initiating a transaction, updating a smart contract state, executing a programmatic function, or performing any predefined action on the blockchain. The verified on-chain action is broadcasted to the blockchain network for execution and inclusion in a block. Miners or validators on the blockchain network process and validate the transaction, ensuring its inclusion in the distributed ledger. After the transaction is confirmed and added to the blockchain, the on-chain action corresponding to the validated off-chain data is executed, thereby reflecting the updated state or result on the blockchain.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
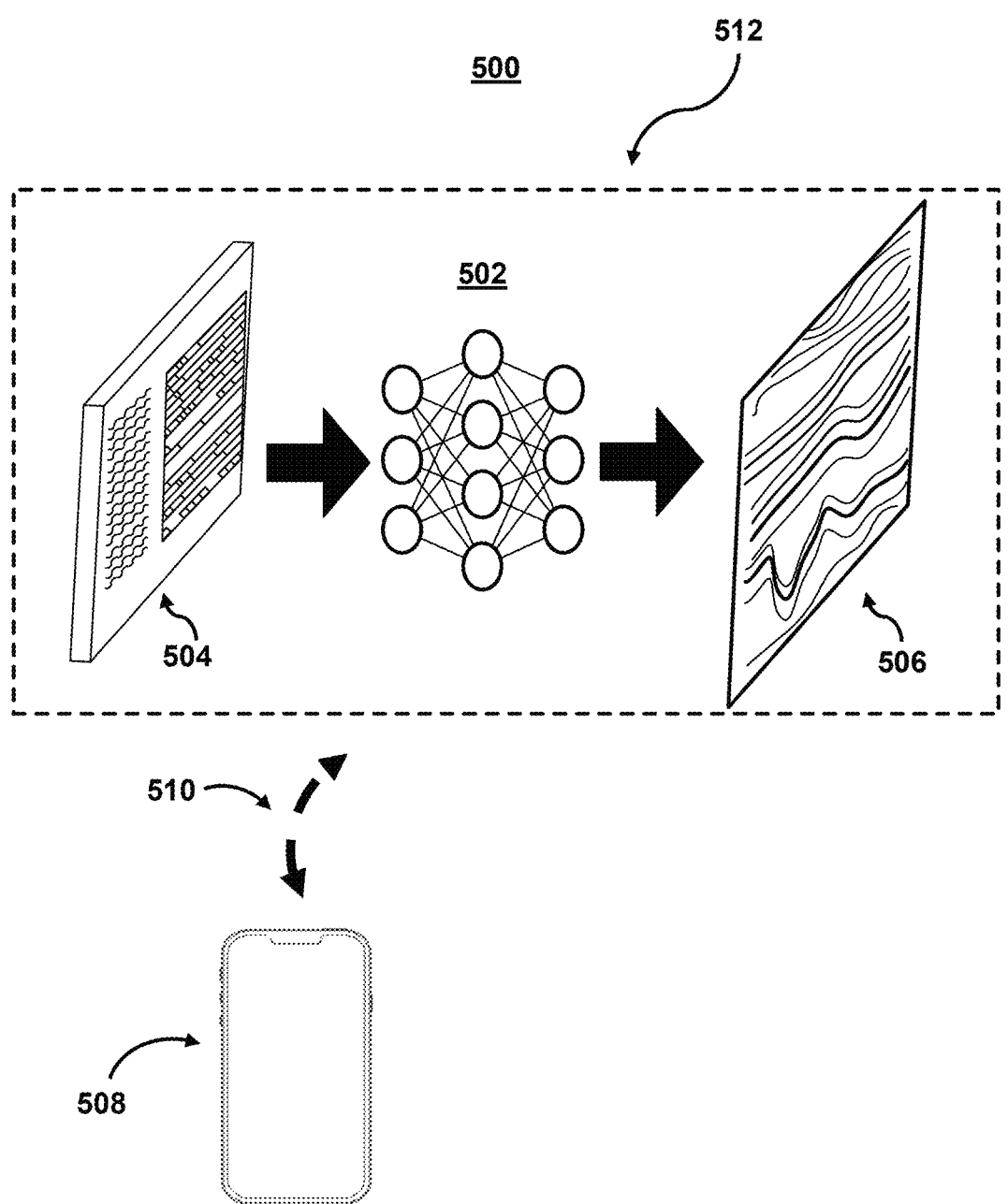
FIG. 5 shows a flowchart of the steps involved in managing resources across global or cloud networks irrespective or resource-readiness, in accordance with one or more embodiments.

FIG. 5 shows illustrative components for a system used to support managing resources across global or cloud networks, in accordance with one or more embodiments. For example, FIG. 5 may show illustrative components used to support managing resources across global or cloud networks. As shown in FIG. 5, system 500 may include mobile device 508 which may correspond to one or more of user devices 310, 320 (FIG. 3). While shown as smartphones in FIG. 5, it should be noted that mobile device 508 may be any computing device, including, but not limited to, a laptop computer, a tablet computer, a hand-held computer, and other computer equipment (e.g., a server), including "smart," wireless, wearable, and/or mobile devices. For example, mobile device 508 may be used by a user (e.g., customer, system administrator, or other user) to perform one or more blockchain actions, in accordance with one or more embodiments. System 500 may also include cloud components 512. For example, cloud components may be implemented as a cloud computing system and may feature one or more component devices. It should be noted, that, while one or more operations are described herein as being performed by particular components of system 500, these operations may, in some embodiments, be performed by other components of system 500. As an example, while one or more operations are described herein as being performed by components of mobile device 508, these operations may, in some embodiments, be performed by cloud components 512. In some embodiments, the various computers and systems described herein may include one or more computing devices that are programmed to perform the described functions. Additionally, or alternatively, multiple users may interact with system 500 and/or one or more components of system 500.

With respect to the components of mobile device 508, mobile devices 508 may receive content and data via input/output (I/O) paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 5, mobile device 508 includes a display upon which to display data.

Additionally, as mobile device 508 is shown as touch-screen smartphones, these displays also act as user input interfaces. It should be noted that in some embodiments, the device may have neither user input interfaces nor displays, and may instead receive and display content using another device (e.g., a dedicated display device such as a computer screen, and/or a dedicated input device such as a remote control, mouse, voice input, etc.). Additionally, the devices in system 500 may run an application (or another suitable program).

Such device may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication path 510. Communication path 510 may include the Internet, a mobile phone network, a mobile voice or data network (e.g., a 5G or LTE network), a cable network, a public switched telephone network, or other types of communications networks or combinations of communications networks. Communication path 510 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

The computing devices may include additional communication paths linking a plurality of hardware, software, and/or firmware components operating together. For example, the computing devices may be implemented by a cloud of computing platforms operating together as the computing devices.

Cloud components 512 may be accessible via an API layer. The API layer may allow the system to provide information from model 502 to mobile device 508. In some embodiments, the API layer may be implemented on mobile device 508. Alternatively or additionally, the API layer may reside on one or more of cloud components 512. The API layer (which may be a REST or Web services API layer) may provide a decoupled interface to data and/or functionality of one or more applications. The API layer may provide a common, programming language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

The API layer may use various architectural arrangements. For example, system 500 may be partially based on the API layer, such that there is strong adoption of SOAP and RESTful Web services, using resources like Service Repository and Developer Portal, but with low governance, standardization, and separation of concerns. Alternatively, system 500 may be fully based on the API layer, such that separation of concerns between layers like the API layer, services, and applications are in place.

In some embodiments, the system architecture may use a microservice approach. Such systems may use two types of layers: Front-End Layer and Back-End Layer where microservices reside. In this kind of architecture, the role of the API layer may provide integration between Front-End and Back-End. In such cases, the API layer may use RESTful APIs (exposition to front-end or even communication between microservices). The API layer may use AMQP (e.g., Kafka, RabbitMQ, etc.). The API layer may use incipient usage of new communications protocols such as gRPC, Thrift, etc.

In some embodiments, the system architecture may use an open API approach. In such cases, the API layer may use commercial or open source API Platforms and their modules. The API layer may use a developer portal. The API layer may use strong security constraints applying WAF and DDOS protection, and the API layer may use RESTful APIs as standard for external integration.

System 500 also includes model 502, which may be a machine learning model, artificial intelligence model, etc. (which may be referred collectively as "models" herein). Model 502 may take inputs 504 and provide outputs 506. The inputs may include multiple datasets, such as a training dataset and a test dataset. Each of the plurality of datasets (e.g., inputs 504) may include data subsets related to user data, predicted forecasts and/or errors, and/or actual forecasts and/or errors. In some embodiments, outputs 506 may be fed back to model 502 as input to train model 502 (e.g., alone or in conjunction with user indications of the accuracy of outputs 506, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a mapping of a logical data model to a platform data model, whether or not a data model corresponds to a given data structure characteristic, whether or not a dataset corresponds to a given data characteristic, etc.).

In a variety of embodiments, model 502 may update its configurations (e.g., weights, biases, or other parameters) based on the assessment of its prediction (e.g., outputs 506) and reference feedback information (e.g., user indication of accuracy, reference labels, or other information). In a variety of embodiments, where model 502 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 502 may be trained to generate better predictions.

In some embodiments, the model (e.g., model 502) may automatically perform actions based on outputs 506. In some embodiments, the model (e.g., model 502) may not perform any actions. The output of the model (e.g., model 502) may be used to determine a synthetic availability of a resource, determine an aggregate availability of a computer network, select cryptographically secure digital assets, recommend alternative blockchain actions, verify actual availabilities of resources, or other actions.

As shown in FIG. 5, in some embodiments, model 502 may be trained by taking inputs 504 and provide outputs 506. Model 502 may include an artificial neural network. In such embodiments, model 502 may include an input layer and one or more hidden layers. Each neural unit of model 502 may be connected with many other neural units of model 502. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 502 may be self-learning and trained, rather than explicitly programmed, and can perform significantly better in certain areas of problem solving, as compared to traditional computer programs. During training, an output layer of model 502 may correspond to a classification of model 502, and an input known to correspond to that classification may be input into an input layer of model 502 during training. During testing, an input without a known classification may be input into the input layer, and a determined classification may be output.

In some embodiments, model 502 may include multiple layers (e.g., where a signal path traverses from front layers to back layers). In some embodiments, back propagation techniques may be utilized by model 502 where forward stimulation is used to reset weights on the "front" neural units. In some embodiments, stimulation and inhibition for model 502 may be more free-flowing, with connections interacting in a more chaotic and complex fashion. During testing, an output layer of model 502 may indicate whether or not a given input corresponds to a classification of model 502 (e.g., a synthetic availability of a resource, an aggregate availability of a computer network, selected cryptographically secure digital assets, alternative blockchain actions, actual availabilities of resources, etc.).

In some embodiments, model 502 may be trained to determine a synthetic availability related to a resource. For example, the system may retrieve (or otherwise obtain) from a database, a first set of information to train model 502. Model 502 may ingest the first set of information as input 504 during a training routine. The first set of information may include a set of training availability characteristics corresponding to a respective resource of a set of resources. For example, each training availability characteristic may be labeled with an availability value associated with the respective training availability characteristic. In a computing network embodiment, the availability characteristics (and training availability characteristics) may be bandwidth information (e.g., maximum data transfer rates, congestion, etc.), latency information (e.g., propagation delay, queuing delay, processing delay, network jitter, etc.), processing power information (e.g., max throughput, routing table size, firewall limitations, intrusion detection system limitations, intrusion prevention system limitations, etc.), memory information (e.g., buffer size, state table size), encryption/decryption information (e.g., encryption/decryption protocols, encryption/decryption standards), scalability information (e.g., addressing limitations, address size information, address availability information, etc.), availability status information (e.g., online, offline, etc.), or other characteristics pertaining to a resource. Each availability characteristic may be labeled with a label indicating an availability value (e.g., an amount of bandwidth, latency value, amount of processing power, amount of memory, a scalability value, availability status value (e.g., online, offline), etc.).

In a financial service embodiment, the availability characteristics may include asset characteristics (e.g., characteristics of a good/currency/medium of exchange). For example, the availability characteristics may include issuing authority information (e.g., a recognized government or central monetary authority within a country), legal tender information (e.g., whether it is authorized by the government for settling debts, transactions, and payments within or outside of the country's borders), denomination and/or amount information, physical form (e.g., bank notes and coins), type (e.g., fiat, commodity backed), security features (e.g., printed security features, cryptocurrency security protocol information, encryption standards), exchange rate information, stability information, regulation information, market demand information, supply information, volatility information, utility information, divisibility information, availability status (e.g., ability to be retrieved or used in transaction, whether the bank branch holding the good/asset/currency/medium of exchange is open) or other information related to a good, asset, currency, or other medium of exchange.

Each availability characteristic may be labeled with a label indicating a liquidity (e.g., availability) value (e.g., a value representing liquidity of the issuing authority, a value indicating how liquid the legal tender is, a value indicating a denomination/amount, a value representing the physical form of the asset, a value indicating the type of asset, a value indicating security features of the asset, an exchange rate, a value indicating a supply of the asset, volatility value of the asset, a value indicating a utility of the asset, a value indicating the divisibility of the asset, a value indicating the availability status (e.g., the asset being available to be used, the asset unavailable to be used, etc.). The liquidity value for each availability characteristic may be normalized (e.g., on a scale 0-1, 0-10, 0-100, or other scale) to indicate a relative liquidity value with respect to a global liquidity value. For example, an asset of a gold bar (e.g., type of asset) may be afforded a liquidity value of 7 on a scale 0-10 where 0 indicated not liquid, and 10 indicated very liquid. As another example, an asset of a United States Dollar may be afforded a liquidity value of 10 on the same scale. Additionally, the liquidity values for the availability characteristics may be based on an embedding model's processing of web scraped availability characteristic information, retrieved (e.g., from a database associated with the computing network) availability characteristic information, or other third-party sourced availability characteristic information. Additionally, each availability characteristic may be labeled with a label indicating a resource identifier associated with the respective resource. For example, where the resource is a bank branch, the system may label each availability characteristic with a bank-branch identifier (e.g., an address of the bank branch, a name of the bank branch, numerical identifier associated with the bank branch).

In some embodiments, the system may generate a feature vector based on the first set of information. For example, the system may provide the first set of information (e.g., the set of training availability characteristics, the set of availability values, known synthetic availability values, resource identifiers, etc.) to an embedding model (e.g., an autoencoder, or other embedding model configured to generate a feature vector) to generate a feature vector that includes the first set of information to be provided to model 502. As another example, the feature vector may be labeled to indicate a historically determined synthetic availability (e.g., a known synthetic availability) based on the set of training availability characteristics. By doing so, model 502 may learn patterns between input features (e.g., the availability characteristics) of input 504 to generate an output 506.

Output 506 may be a predicted synthetic availability related to a resource. For example, model 502 may ingest the first set of information (e.g., the raw data, the feature vector(s), etc.) as input 504 to generate output 506, indicating a predicted synthetic availability related to the resource. The predicted synthetic availability might be predicted (e.g., via model 502) based availability characteristics of resources (or a user-account based resources). For example, the synthetic availability may represent a synthetic liquidity of a bank branch or a synthetic liquidity of a user account's liquidity at a given bank branch (e.g., synthetic liquidity of assets that are associated with a user in a user account of the user at the bank branch). Model 502 may learn associations or other patterns between the availability characteristics to generate the predicted synthetic availability as output 506. The predicted synthetic availability may be a value (e.g., numerical value, alphanumerical value, etc.) of a synthetic availability associated with the resource. During the training routine, when model 502 generates the predicted synthetic availability as output 506, output 506 may be fed back into model 502 to update one or more configurations (e.g., weights, biases, or other parameters) based on its assessment of its prediction (e.g., outputs 506) and reference feedback information (e.g., user indication of accuracy, reference labels, ground truth information, predetermined synthetic availability information, known synthetic availability information, etc.). For example, the system may update one or more configurations of model 502 based on a computed accuracy metric between output 506 and a known output (e.g., ground truth information indicating a correct synthetic availability). For instance, the accuracy metric may be based on a loss function (e.g., mean squared error, cross-entropy loss, mean absolute error, hinge loss), a gradient descent algorithm (e.g., stochastic gradient descent, mini-batch gradient descent, batch gradient descent), back propagation, or other reference feedback information to generate more accurate predictions based on the predicted output 506 and a known output. By doing so, model 502 may be trained to generate more accurate predictions.

In some embodiments, model 502 may be trained to select a cryptographically secure digital asset. For example, the system may retrieve (or otherwise obtain) from a database, a second set of information to train model 502. Model 502 may ingest the second set of information as input 504 during a training routine. The second set of information may include action characteristics (e.g., of blockchain actions) of an action and cryptographically secure digital asset characteristics.

In a computing network embodiment, the action characteristics may indicate a type of blockchain action (e.g., an allocation of computational resources), a service identifier (e.g., a network service to be provided), a timestamp (e.g., a timestamp indicating when the service is to be provided), an entity account identifier (e.g., an identifier indicating a user to which the service is to be provided for, a company identifier indicating a company to which the service is to be provided for, etc.), or other characteristics of an action to be performed. The cryptographically secure digital assets may refer to a token or other digital asset (e.g., NFT, cryptocurrency, utility token, etc.) that represents an availability of a given resource. For example, as each action (e.g., a resource allocation to provide a service) is associated with its own requirements (e.g., to provide such service), the system may select a cryptographically secure digital asset to represent an availability of one or more resources needed to provide the service. For example, each cryptographically secure digital asset may be associated with a set of characteristics indicating a value (e.g., a value of availability), security protocols (e.g., how secure the asset is), requirements (e.g., asset standards, etc.), or other characteristics. Such characteristics may correspond to action characteristics, and as such, the system may select a cryptographically secure digital asset to represent the availability of computer resources. For example, each action characteristic may be associated with a label indicating a required resource for providing the action (e.g., service, resource allocation procedure, etc.), and each cryptographically secure digital asset may represent a resource and the properties of that resource (e.g., via the cryptographically secure digital asset characteristics). As such, model 502 may be trained to learn associations between actions (and the characteristics of such actions) and cryptographically secure digital assets used to represent availabilities of the resources needed to provide the service. By doing so, the model may learn to select standardized cryptographically secure digital assets to represent availabilities of resources. This in turn enables the system to balance the digital log based on actual/synthetic availabilities of resources as the model learns (i) tokenized representations of availabilities of resources, and (ii) which resources are commonly used to provide a service.

In a financial service embodiment, the action characteristics may be transaction characteristics. For example, the transaction characteristics may include an amount (e.g., denomination amount, monetary amount, amount of currency, amount of an asset, etc.), one or more conditions of the transaction, a type of resource (e.g., a type of asset, such as a stock, bond, currency, crypto currency, fiat money, etc.), a time stamp (e.g., a time at which the transaction is to be conducted), a payer user-account identifier (e.g., an account identifier identifying the payer of the transaction), a beneficiary user-account identifier (e.g., an account identifier identifying the beneficiary of the transaction), or other transaction characteristic information.

In some embodiments, the system may generate a feature vector based on the second set of information. For example, the system may provide the second set of information (e.g., the set of action characteristics, cryptographically secure digital asset characteristics, historically selected cryptographically secure digital assets based on historical action characteristics, etc.) to an embedding model (e.g., an autoencoder, or other embedding model configured to generate a feature vector) to generate a feature vector that includes the second set of information to be provided to model 502. For example, the feature vector may represent the second set of information in an embedding space (e.g., a numeric embedding, an alphanumeric embedding, etc.).

The feature vector may include one or more labels indicating which embedding corresponds to what action characteristic. For example, an amount transaction characteristic may be labeled as "transaction amount" for the embedding "4392518." The cryptographically secure digital asset characteristics may include availability characteristics (e.g., as described above) of cryptographically secure digital assets (e.g., cryptocurrencies, tokens, NFTs, etc.). The cryptographically secure digital asset characteristics may be labeled. For example, the system may generate a feature vector representing the cryptographically secure digital asset characteristics in an embedding space. The feature vector may include one or more labels indicating which embedding corresponds to what cryptographically secure digital asset characteristic. For example, a security protocol characteristic may be labeled as "protocol" for the embedding "324174." As another example, the feature vector may be labeled to indicate action characteristics, cryptographically secure digital asset characteristics, and a cryptographically secure digital asset that was selected based on a historical action characteristic. For example, the feature vector may be labeled to indicate a historically selected cryptographically secure digital asset based on a historical set of action characteristics, with respect to a set of available cryptographically secure digital asset characteristics. By doing so, model 502 may learn patterns between input features (e.g., the action characteristics and the cryptographically secure digital asset characteristics) of input 504 to generate an output 506.

Output 506 may be a selected cryptographically secure digital asset. For example, model 502 may ingest the second set of information (e.g., the raw data, the feature vector(s), etc.) as input 504 to generate output 506, indicating a selected cryptographically secure digital asset. The selected cryptographically secure digital asset might be selected (e.g., via model 502) based the action characteristics and the cryptographically secure digital asset characteristics. For example, because each action (e.g., transaction) is associated with its own set of requirements (e.g., an amount, asset type, etc.), model 502 may learn associations or other patterns between the action characteristics and characteristics of cryptographically secure digital assets to select a cryptographically secure digital asset in which to base the transaction on while a resource is offline or otherwise unavailable. For example, if the action (e.g., transaction) is for $100 while a bank branch is closed, the system may select a cryptographically secure digital asset to be used to conduct the transaction while the bank branch is closed. The selected cryptographically secure digital asset may be a cryptographically secure digital asset that the system (e.g., model 502) selects that reduces the risk of the transaction from departing from an original value while the bank is closed. For instance, where the transaction is for $100, model 502 may be configured to select a cryptographically secure digital asset to be used to conduct the transaction while the bank branch is closed that is not-volatile, such that when the bank-branch reopens, a difference between the value of the selected cryptographically secure digital asset is within a threshold value of the original $100 value of the transaction. By doing so, the system may reduce transaction errors stemming from cryptocurrency volatility. In other words, model 502 may select the best suited cryptographic digital asset for completing the transaction based on the requirements of the transaction, the availability of the resources (e.g., bank branches), and characteristics (e.g., volatility) of the cryptographically secure digital assets. As such, model 502 may learn associations or other patterns between the action characteristics and the cryptographically secure digital assets to generate the selected cryptographically secure digital assets as output 506. The selected cryptographically secure digital asset may be represented by a value (e.g., numerical value, alphanumerical value, etc.) indicating the identity of the cryptographically secure digital asset. During the training routine, when model 502 generates the selected cryptographically secure digital asset as output 506, output 506 may be fed back into model 502 to update one or more configurations (e.g., weights, biases, or other parameters) based on its assessment of its prediction (e.g., outputs 506) and reference feedback information (e.g., user indication of accuracy, reference labels, ground truth information, predetermined synthetic availability information, known synthetic availability information, etc.). For example, the system may update one or more configurations of model 502 based on a computed accuracy metric between output 506 and a known output (e.g., ground truth information indicating correctly selected cryptographically secure digital asset). For instance, the accuracy metric may be based on a loss function (e.g., mean squared error, cross-entropy loss, mean absolute error, hinge loss), a gradient descent algorithm (e.g., stochastic gradient descent, mini-batch gradient descent, batch gradient descent), back propagation, or other reference feedback information to generate more accurate predictions based on the predicted output 506 and a known output. By doing so, model 502 may be trained to generate more accurate predictions.

In some embodiments, model 502 may be trained to determine an aggregate availability (e.g., for a computer network). For example, the system may retrieve (or otherwise obtain) from a database, a third set of information to train model 502. Model 502 may ingest the third set of information as input 504 during a training routine. The third set of information may include actual availability information (e.g., actual availability of one or more resources), synthetic availability information (e.g., synthetic availability of one or more resources), or other availability information. As such, model 502 may be trained to learn associations between actual and/or synthetic availability information to determine the aggregate availability of the computer network to provide a service. For example, because the availability may be actual and/or synthetic availability, the system may monitor for whether resources become online/offline. In scenarios where the resources are online, the system may use actual availability in lieu of synthetic availability as the actual availability reflects more accurate information about the particular resource (or user account resources available at that resource). As such, for any resources that are determined to be online at the time of the action (e.g., allocation of resources to provide a service, conducting a transaction, etc.), the system may determine actual availability for that resource and use the actual availability (and any synthetic availability needed from other resources) to perform the action. Using the actual availability and the synthetic availability, model 502 may generate an aggregate availability of the computing network. By doing so, the system may determine a network-wide availability of resources for performing an action.

In some embodiments, the system may generate a feature vector based on the third set of information. For example, the system may provide the second set of information (e.g., synthetic availability of resource(s), actual availability of resource(s), historically determined aggregate availability based on synthetic/actual availability, etc.) to an embedding model (e.g., an autoencoder, or other embedding model configured to generate a feature vector) to generate a feature vector that includes the second set of information to be provided to model 502. For example, the feature vector may represent the third set of information in an embedding space (e.g., a numeric embedding, an alphanumeric embedding, etc.).

The feature vector may include one or more labels indicating which embedding corresponds to what availability. For example, a synthetic availability may be labeled "synthetic" for the embedding "368424." As another example, the feature vector may be labeled to indicate a historically determined (e.g., known) aggregate availability based on one or more synthetic or actual availabilities of resources (e.g., synthetic/actual availability values). By doing so, model 502 may learn patterns between input features (e.g., synthetic/actual availability) of input 504 to generate an output 506.

Output 506 may be an aggregate availability. For example, model 502 may ingest the third set of information (e.g., the raw data, the feature vector(s), etc.) as input 504 to generate output 506, indicating an aggregate availability of the computing network. Model 502 may learn associations or other patterns between the synthetic availability and/or the actual availability to generate the aggregate availability as output 506. The aggregate availability may be represented by a value (e.g., numerical value, alphanumerical value, etc.) indicating a network-wide availability of resources available to provide the service (or complete the transaction). During the training routine, when model 502 generates the aggregate availability as output 506, output 506 may be fed back into model 502 to update one or more configurations (e.g., weights, biases, or other parameters) based on its assessment of its prediction (e.g., outputs 506) and reference feedback information (e.g., user indication of accuracy, reference labels, ground truth information, predetermined synthetic availability information, known synthetic availability information, etc.). For example, the system may update one or more configurations of model 502 based on a computed accuracy metric between output 506 and a known output (e.g., ground truth information indicating a correctly predicted aggregate availability). For instance, the accuracy metric may be based on a loss function (e.g., mean squared error, cross-entropy loss, mean absolute error, hinge loss), a gradient descent algorithm (e.g., stochastic gradient descent, mini-batch gradient descent, batch gradient descent), back propagation, or other reference feedback information to generate more accurate predictions based on the predicted output 506 and a known output. By doing so, model 502 may be trained to generate more accurate predictions. In some embodiments, however, the aggregate availability may be generated based on a RAG framework to obtain accurate, up to date, information in which to generate the aggregate availability.

Figure 6:
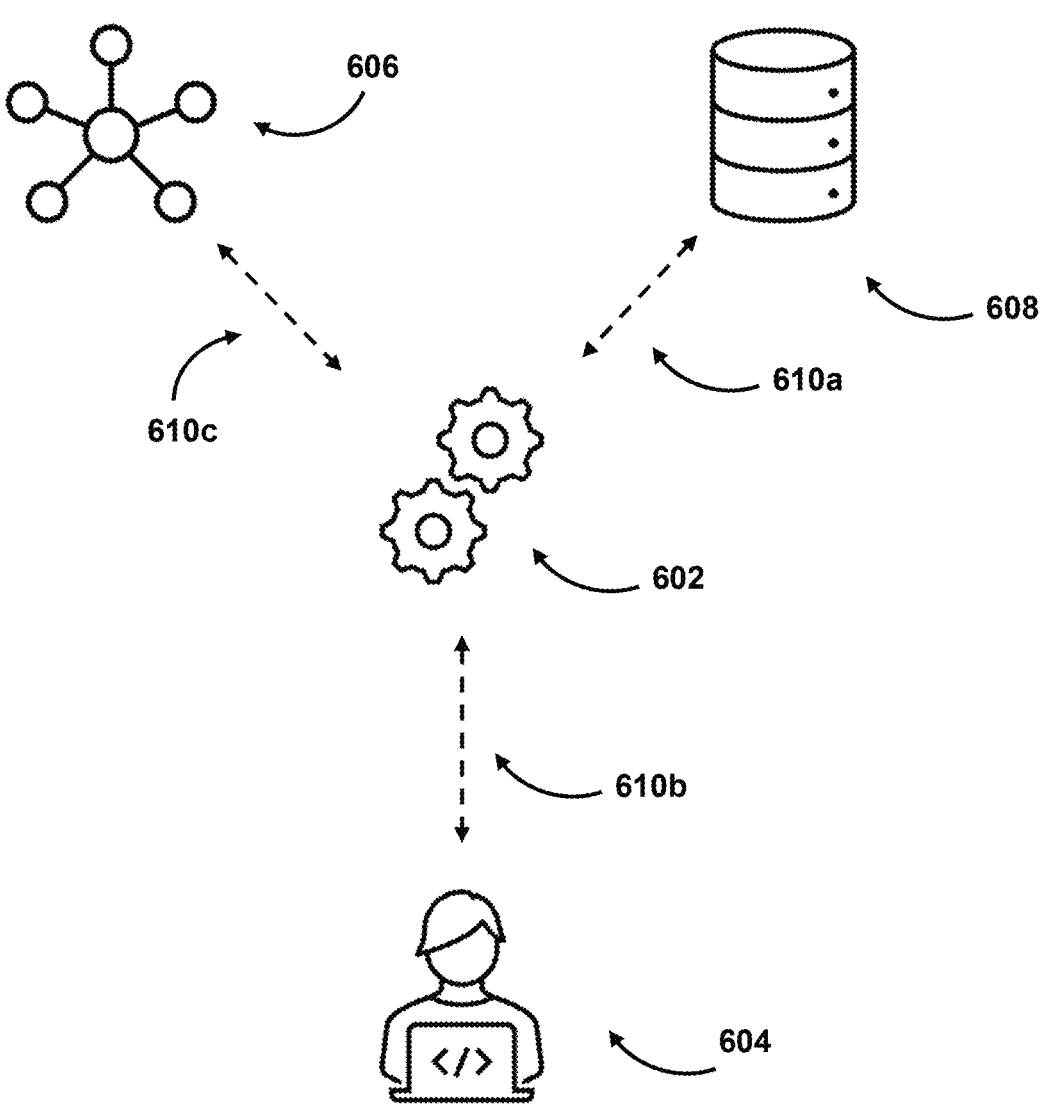
FIG. 6 show illustrative components for a system used to support managing resources across global or cloud networks, in accordance with one or more embodiments.

In some embodiments, the model 502 may be implemented in a Retrieval-Augmented Generative (RAG) framework. For example, FIG. 6 shows illustrative components for a RAG framework used to support managing resources across global or cloud networks, in accordance with one or more embodiments. The components of FIG. 6 may be implemented in cloud components 512 of FIG. 5. FIG. 6 shows RAG framework 600, which may include implementation component 602, interface component 604, an artificial intelligence model 606, and a database 608. For example, implementation component 602 may act as a middleman for facilitating communication between each of interface component 604, artificial intelligence model 606, and database 608. It should be noted that other components of RAG framework 600 may exist, in accordance with one or more embodiments. Interface component 604 may enable interaction with the RAG framework 600. For example, interface component 604 may be configured to provide inputs to artificial intelligence model 606 and/or database 608, as well as receive outputs from artificial intelligence model 606 and/or database 608. For example, where artificial intelligence model 606 is an LLM, interface component 604 may provide one or more instructions (e.g., queries, synthetic availabilities, requests to generate aggregate availability based on synthetic or actual availabilities, requests to generate an alternative blockchain action, a request for a recommendation, prompts, structured prompts, etc.) to the LLM, and receive one or more outputs from the LLM (e.g., aggregate availability of resources of a computing network, aggregate availability of user-account based/accessible resources of a computing network, recommendation of an alternative blockchain action to be processed, etc.). Additionally, or alternatively, interface component 604 may be able to directly interact with database 608. For example, interface component 604 may be configured to provide one or more queries to database 608 (e.g., to search for data, filter data, etc.) and receive outputs from database 608 (e.g., aggregate availabilities, aggregate availability of user-account based/accessible resources, recommendations of alternative blockchain actions, etc.). For example, a user may use interface component 604 to interact with one or more components of RAG framework 600, such as by submitting prompts to the artificial intelligence model 606 via a user interface.

FIG. 6 also shows communication paths 610a-610c, which may include the Internet, a mobile phone network, a mobile voice or data network (e.g., a 5G or LTE network), a cable network, a public switched telephone network, or other types of communications networks or combinations of communications networks. Communication paths 610a-610c may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The components of FIG. 6 may include additional communication paths linking a plurality of hardware, software, and/or firmware components operating together.

The RAG framework offers several advantages over conventional artificial intelligence model training frameworks. For example, RAG frameworks optimize the outputs of artificial intelligence models (e.g., large language models) by leveraging an authoritative database (e.g., database 608)

prior to generating a response to a given input (e.g., instruction, query, etc.). For instance, RAG framework 600 enables artificial intelligence model 606 to be communicatively couples with database 608 to enable the artificial intelligence model 606 to reference database 608 with contextual knowledge (e.g., information that is in a specific domain, information that is specific to an entity, current availability of a resource (e.g., online, offline, etc.), actual availabilities of resources, synthetic availabilities of resources, weighted availabilities of resources, etc.) related to a given input that is provided to the artificial intelligence model 606. For example, by using RAG framework 600, where the artificial intelligence model 606 is an LLM, the LLM may generate responses that is tailored to information that is specific to the entity hosting database 608. Moreover, by utilizing the RAG framework 600, the LLM itself does not need to be retrained when new contextual information (e.g., new data) is updated or uploaded to database 608 itself. For instance, in conventional artificial intelligence model training, the artificial intelligence model itself must be retrained when new data becomes available. In contrast, using RAG framework 600, given that the artificial intelligence model 606 is communicatively coupled to the database 608, when new information is pushed (e.g., stored) to database 608, the artificial intelligence model 606 may access database 608 to retrieve additional information (e.g., contextual information) to enhance the artificial intelligence model 606 responses, thereby reducing the amount of computational resources conventionally required to train/retrain artificial intelligence models.

In some embodiments, artificial intelligence model 606 may be trained. For example, artificial intelligence model 606 may be trained to generate an aggregate availability. For instance, artificial intelligence model 606 may be an LLM. The LLM may be trained on a fourth set of training data. The fourth set of training data may include (i) one or more availabilities (e.g., synthetic availability, actual availabilities, etc.) corresponding to one or more resources of a computing system, and (ii) an aggregate availability. For example, the fourth set of training data may include a first synthetic availability of a first resource and a second synthetic availability of a second resource. The first and second synthetic availabilities may be labeled as synthetic/actual availabilities with their corresponding value (e.g., an amount of synthetic availability). Additionally or alternatively, the first and second synthetic availabilities may include other labels denoting availability type, cryptographically secure digital asset identifier labels (e.g., a cryptographically secure digital asset identifier label that identifies the digital asset representing the synthetic availability), or other information. The fourth set of training data may also include a labeled aggregate availability corresponding to both of the first synthetic availability and the second synthetic availability. In this way, the fourth set of training data may reflect the relationship between the synthetic availabilities and the determined aggregate availability to which the LLM will be trained on. It should be noted that the fourth set of training data may include variations of first and second synthetic availabilities for a variety of computing system resources.

The system may then provide the fourth set of training data to the LLM during a training routine. For example, as described above, the LLM may be communicatively coupled to a retrieval component (e.g., implementation component 602). In some embodiments, the retrieval component is configured to communicate between artificial intelligence model 606 and database 608, to retrieve actual availabilities of resources of the computer network to be provided to the LLM. Additionally or alternatively, the retrieval component may be configured to communicate between artificial intelligence model 606 and database 608, to retrieve weighted availabilities related to resources of the computer network. For example, during the training routine, the system may provide the fourth set of training data to the LLM. The LLM may learn the relationships between the synthetic availabilities (and the attributes/features thereof) and the aggregate availabilities (e.g., of the fourth training data set) to generate a predicted aggregate availability. For instance, when the LLM is provided a synthetic availabilities (e.g., the first synthetic availability, the second synthetic availability), the LLM may provide a response indicating an aggregate availability. Upon learning the relationships between the synthetic availabilities and the provided aggregate availabilities, the LLM may access the database (e.g., database 608) to retrieve (i) actual availability corresponding to the synthetic availabilities, and/or (ii) weighted availabilities related to resources of the computing network.

For example, the LLM may access the database (e.g., via the retrieval component) to obtain the most accurate, up-to-date information regarding the actual availability of a resource. For instance, where the first synthetic availability corresponds to a first resource of the computer network, and the first resource is determined to be online at the time of determining the aggregate availability of the computing network (e.g., via the LLM), the retrieval component may retrieve a first actual availability from the database 608 that corresponds to the first resource. By doing so, the system may use the first actual availability in lieu of the first synthetic availability when generating the aggregate availability to provide a more accurate aggregate availability computation.

As another example, the LLM may access the database (e.g., via the retrieval component) to obtain a weigh corresponding to a synthetic/actual availability. For example, the database 608 may store a set of weights to be applied to the synthetic availability (or actual availability) to emphasize or deemphasize the resulting value of the aggregate availability. For instance, in a financial services embodiment, the system may weigh actual liquidity greater than that of a synthetic liquidity of a resource. Additionally or alternatively, the system may weight a type of availability (e.g., fiat cash) greater than that of another type of availability (e.g., stock). As such, the system may retrieve a weight corresponding to the resource. By doing so, the system may use weights to provide a more accurate availability computation.

The system may then receive, from the LLM during the training routine, a set of candidate aggregate availabilities. For example, after an initial training step (described above), the LLM may generate a set of candidate aggregate availabilities. The system may then provide the set of candidate aggregate availabilities to interface component 604, via implementation component 602, where a user (e.g., a subject matter expert) may fine-tune train the LLM.

Fine-tune training (or fine tuning) refers to a training method where a pre-trained artificial intelligence is adapted for a specific task or use case. For example, fine-tuning may involve a user providing additional information (e.g., labels, indication of accuracy, prompts etc.) to the LLM to generate more accurate, contextualized, domain specific responses from the LLM. For instance, with respect to the above, a user may provide, via interface component 604, a message to the LLM that includes an accuracy value corresponding to each of the set of candidate aggregate availabilities that the LLM generated. The accuracy value may be a numerical value, such as a normalized numerical value according to a given scale (0-1, 0-10, 0-100, etc.), a percentage, or other quantitative metric for measuring accuracy. By doing so, the LLM may be further trained (e.g., fine-tuned) using quantitative accuracy metrics to better predict or generate responses indicating an aggregate availability of the computing system.

In some embodiments, artificial intelligence model 606 may be trained. For example, artificial intelligence model 606 may be trained to generate an alternative blockchain action to be processed. For instance, artificial intelligence model 606 may be an LLM. The LLM may be trained on a fifth set of training data. The fifth set of training data may include (i) requests to perform a blockchain action, and/or (ii) aggregate availabilities corresponding to the requests to perform a blockchain action. For example, the fifth set of training data may include a first blockchain action corresponding to a first aggregate availability, and a second blockchain action corresponding to a second aggregate availability. The first and second blockchain actions may include one or more labels (e.g., indicating a type of action to be performed, a transaction amount, a payer identifier, a beneficiary identifier, etc.). The first and second aggregate availabilities may also be labeled indicating availability types (e.g., synthetic availability, actual availability, asset type (e.g., fiat currency, cryptocurrency, stock, bonds, etc.)), an amount (e.g., amount of aggregate availability), or other information. In this way, the fifth set of training data may reflect the relationship between the blockchain actions and the aggregate availabilities in which the blockchain actions use, to which the LLM will be trained on.

The system may then provide the fifth set of training data to the LLM during a training routine. For example, as described above, the LLM may be communicatively coupled to a retrieval component (e.g., implementation component 602). In some embodiments, the retrieval component is configured to communicate between artificial intelligence model 606 and database 608, to retrieve (i) similar blockchain actions historically processed by the computer network successfully, and (ii) similar aggregate availabilities corresponding to the similar blockchain actions historically processed by the computer network successfully, which is to be provided to the LLM. For example, during the training routine, the system may provide the set fifth set of training data to the LLM. The LLM may learn the relationships between the blockchain actions and the aggregate availabilities. For instance, when the LLM is provided the blockchain actions and the corresponding aggregate availabilities, the LLM may provide a response indicating an alternative blockchain action (e.g., which may include a different aggregate availability). Upon learning the relationships between the blockchain actions and the aggregate availabilities, the LLM may access the database (e.g., database 608) to retrieve (i) similar blockchain actions historically processed by the computer network successfully, and (ii) similar aggregate availabilities corresponding to the similar blockchain actions historically processed by the computer network successfully.

For example, the LLM may access the database (e.g., via the retrieval component) to verify whether the provided aggregate availabilities (e.g., of the fifth set of training data) is able to be used to process the corresponding blockchain actions (e.g., of the fifth set of training data). For example, the (i) similar blockchain actions historically processed by the computer network successfully, and (ii) similar aggregate availabilities corresponding to the similar blockchain actions historically processed by the computer network successfully may serve as contextual information to enable the LLM to update its prediction (e.g., recommendation of an alternative blockchain action). In other words, the similar blockchain actions and similar aggregate availability may provide supplemental information to the LLM to update an initial recommendation of an alternative blockchain action to be performed without user intervention.

For example, the LLM may generate an initial recommendation based on the fifth set of training data, and then access the database (e.g., via the retrieval component) to obtain the (i) similar blockchain actions historically processed by the computer network successfully, and (ii) similar aggregate availabilities corresponding to the similar blockchain actions historically processed by the computer network successfully. Using this obtained information, the LLM may regenerate a recommendation based on the obtained information from the database. The similar blockchain actions and similar aggregate availabilities may be retrieved based on a similarity metric between (i) the blockchain actions of the fifth set of training data and the blockchain actions stored in the database, and (ii) the aggregate availabilities of the fifth set of training data and the aggregate availabilities stored in the database. The similarity metric may be a Euclidean distance, Manhattan distance, cosine similarity, or other similarity metric between vectorized (e.g., embedded via an embedding model) blockchain actions and aggregate availabilities, respectively. In some embodiments, the LLM (or other system components) may compare the similarity metrics to a similarity metric threshold. If the similarity metric satisfies the similarity metric threshold (e.g., greater or equal to the similarity metric threshold), the system may select the corresponding blockchain action and/or aggregate availability as a candidate blockchain action/candidate aggregate availability. For example, the LLM may compare a first similarity metric between (i) a first blockchain action (e.g., of the fifth set of training data), and (ii) a first blockchain action stored in the database to a first similarity metric threshold. If the first similarity metric satisfies the first similarity metric threshold, the system may select the first blockchain action stored in the database (and the aggregate availability corresponding to the first blockchain action) as a candidate alternative blockchain action to be performed.

The system may then receive, from the LLM during the training routine, a set of candidate alternative blockchain actions. For example, after the initial training step (described above), the LLM may generate a set of candidate blockchain actions to be performed based on the (i) similar blockchain actions historically processed by the computer network successfully, and (ii) similar aggregate availabilities corresponding to the similar blockchain actions historically processed by the computer network successfully. The system may then provide the set of candidate alternative blockchain actions to interface component 604, via implementation component 602, where a user (e.g., a subject matter expert) may fine-tune train the LLM.

Fine-tune training (or fine tuning) refers to a training method where a pre-trained artificial intelligence is adapted for a specific task or use case. For example, fine-tuning may involve a user providing additional information (e.g., labels, indication of accuracy, prompts etc.) to the LLM to generate more accurate, contextualized, domain specific responses from the LLM. For instance, with respect to the above, a user may provide, via interface component 604, a message to the LLM that includes an accuracy value corresponding to each of the set of candidate alternative blockchain actions that the LLM generated. The accuracy value may be a numerical value, such as a normalized numerical value according to a given scale (0-1, 0-10, 0-100, etc.), a percentage, or other quantitative metric for measuring accuracy. By doing so, the LLM may be further trained (e.g., fine-tuned) using quantitative accuracy metrics to better predict or generate recommended alternative blockchain actions.

Figure 7:
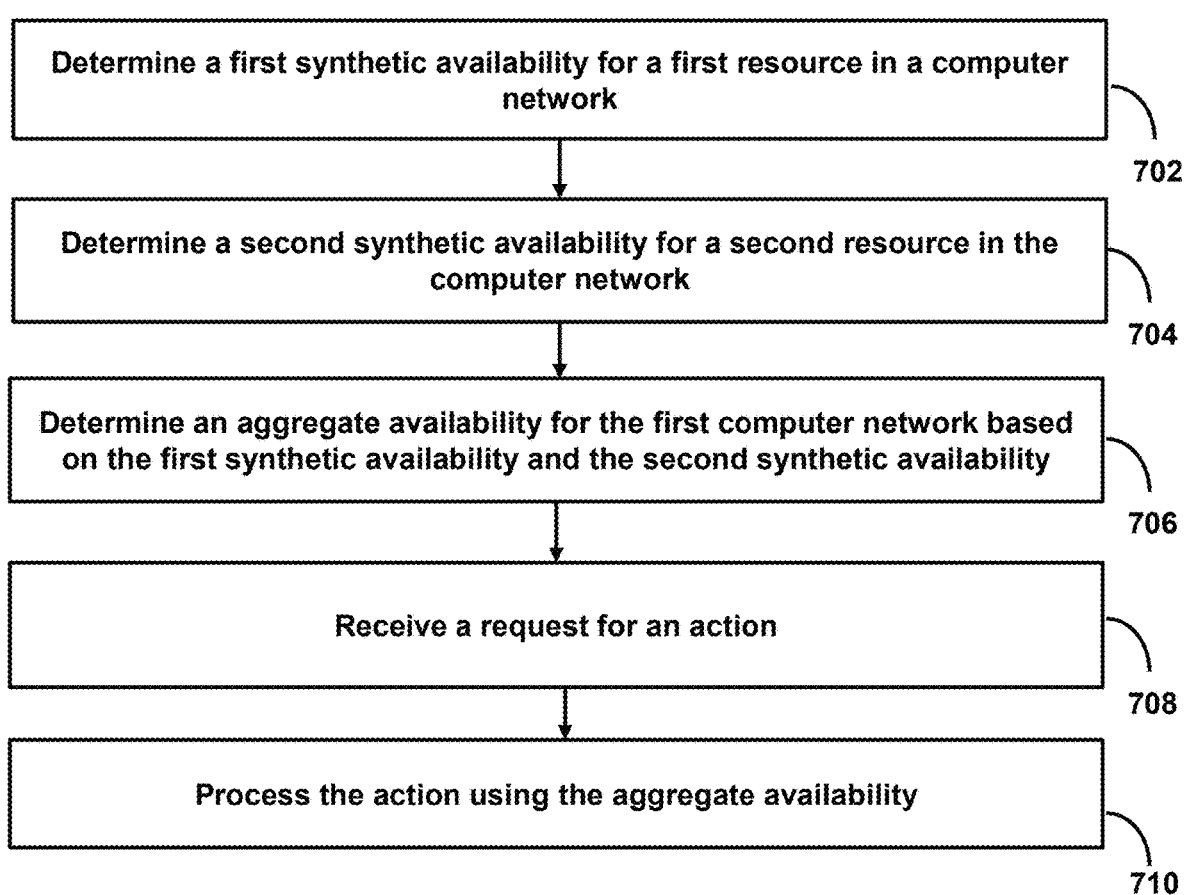
FIG. 7 shows illustrative components for a Retrieval-Augmented Generation (RAG) framework used to support managing resources across global or cloud networks, in accordance with one or more embodiments.

FIG. 7 shows a flowchart of the steps involved in managing global or cloud networks irrespective of resource-readiness, in accordance with one or more embodiments. For example, the system may use process 700 (e.g., as implemented on one or more system components described above) in reduce the amount of computer resource reallocations for services.

At step 702, process 700 (e.g., using one or more components described above) determines a first synthetic availability for a first resource in the computer network. For example, the system may determine, using a first self-executing program, the first synthetic availability for the first resource. The first synthetic availability may be represented by a first cryptographically secure digital asset in the digital log. The first synthetic availability may be related to a first actual availability for the first resource. For example, to reduce the amount of computer resource allocations for a service, the system may determine a synthetic availability of a resource within the first computer network. The synthetic availability may be related to the actual availability of the resource (e.g., characteristics of availability of the resource, bandwidth, processing power, data packet ingestion rate, last known actual availability, or other actual-availability-related information). In some embodiments, where a resource is associated with one or more computational limits, the synthetic availability may represent that the computational limits of the respective resource are maxed out or that the resource is currently unavailable. For example, if the resource has a maximum processing load of 1000 instructions a minute, the synthetic availability may indicate that the resource is currently processing 900 instructions a minute. As another example, the synthetic availability may represent that the resource is currently offline or otherwise unavailable. By determining the synthetic availability for the computing resource, the system may assume a "worst case scenario" to enable the system to allocate resources more efficiently as opposed to simply allocating resources irrespective of future processing loads.

In a financial services embodiment, the system may determine a first synthetic availability (e.g., liquidity) of a bank branch (e.g., resource). For example, as described above, the first computing network may represent a banking network, where each resource of the computing network is a bank branch that is part of that banking network. To enable users (e.g., customers) of bank-branches access to assets held in those bank branches irrespective of whether such bank branches are open or closed for business (e.g., available or unavailable), the system may determine a synthetic liquidity of the assets held a respective bank branch. For example, synthetic liquidity may indicate the liquidity of assets (e.g., goods/currency/medium of exchange) associated with a bank branch (or a user account at that bank branch) when the bank branch is closed, unavailable, or otherwise cannot provide access to the assets associated with (e.g., held at) that bank branch. In some embodiments, the system may determine a synthetic liquidity of assets held by a user account at the bank branch. For example, where a user (e.g., customer) is attempting to complete a transaction involving one or more closed bank branches, the system may leverage determined synthetic liquidity of assets (e.g., based on its relation to actual liquidity of the users last known assets prior to the bank branch becoming unavailable)

pertaining to the user's account at a given bank branch. By doing so, transactions (e.g., blockchain actions) may be completed even when the bank branch is closed. When the bank branch becomes available (e.g., online, reopens, etc.), the system may replace the synthetic availability with actual availability for the user's account and/or bank branch.

At step 704, process 700 (e.g., using one or more components described above) determines a second synthetic availability for a second resource in the computer network. For example, the system may determine, using a second self-executing program, the second synthetic availability for the second resource. The second synthetic availability may be represented by a second cryptographically secure digital asset in the digital log. The second synthetic availability may be related to a second actual availability for the second resource. For example, similar to the discussion above, the system may determine a synthetic availability of a second resource (or a resource related to a user account, such as when a resource is available through a cloud computing provider, and the user uses an account to access a given resource). By doing so, the system may determine the synthetic availability of resources within a computing network to allocate resources for a service. In a financial services embodiment, the system may determine the synthetic availability (e.g., liquidity) of a bank branch (or liquidity of assets held by a user account at that bank branch) to complete transactions irrespective of whether the bank branch is available or not.

In a financial services embodiment, a user (e.g., a customer) may want to complete a transaction (e.g., a blockchain action) using assets that the customer holds that are held a first bank branch (e.g., resource) and a second bank branch (e.g., a second resource). For example, the customer may have a user account at each of the first bank branch and the second bank branch. The first bank branch may hold a first set of assets (e.g., a first stock, a first bond, a first amount of cryptocurrency, and a first amount of fiat currency). The system may determine a first synthetic availability (e.g., liquidity) of the first set of assets. For example, the first synthetic availability may be determined based on a combination of the first set of assets. The second bank branch may hold a second set of assets (e.g., a second amount of fiat currency, and a second amount of a precious metal). The system may determine a second synthetic availability (e.g., liquidity) of the second set of assets. For example, the second synthetic availability may be determined based on a combination of the second set of assets. The system determines such synthetic availabilities to enable the user to complete a transaction irrespective of resource readiness (e.g., the bank branches being open or closed). As will be discussed later, the system may determine a first aggregate availability (e.g., an aggregate liquidity) of the resources (e.g., the bank branches, the customer's aggregate liquidity of assets held at the bank branches to which the user has an account at) to complete the transaction. In this way, the system enables the user to complete a transaction using synthetic liquidity of his/her assets at any given point in time.

In some embodiments, determining (i) the first synthetic availability for the first resource in the first computer network, and (ii) the second synthetic availability for the second resource in the first computer network may be determined by an artificial intelligence model. For example, as each service has its own set of requirements, and each resource to be allocated to a service has its own set of availability characteristics (a set of limitations, a set of requirements, etc.), the system may leverage an artificial intelligence model to determine synthetic availabilities for resources within the computing network. In some embodiments, the system may determine synthetic availabilities for resources that are unavailable (e.g., offline). In some embodiments, the system may determine synthetic availabilities for resources that are available (e.g., online). For example, the system may identify a set of availability characteristics associated with a resource. The availability characteristics may be bandwidth information (e.g., maximum data transfer rates, congestion, etc.), latency information (e.g., propagation delay, queuing delay, processing delay, network jitter, etc.), processing power information (e.g., max throughput, routing table size, firewall limitations, intrusion detection system limitations, intrusion prevention system limitations, etc.), memory information (e.g., buffer size, state table size), encryption/decryption information (e.g., encryption/decryption protocols, encryption/decryption standards), scalability information (e.g., addressing limitations, address size information, address availability information, etc.), availability status information (e.g., online, offline, etc.), or other characteristics pertaining to a resource.

The system may provide the set of availability characteristics associated with the first resource to an artificial intelligence model trained to determine synthetic availabilities of resources. For example, as described above, the system may provide the set of availability characteristics associated with the first resource as input to the artificial intelligence model. The artificial intelligence model may generate an output indicating the first synthetic availability of the first resource. The system may also provide the set of availability characteristics associated with the second resource to the artificial intelligence model trained to determine synthetic availabilities of resources. For example, the system may provide the set of availability characteristics associated with the second resource as input to the artificial intelligence model. The artificial intelligence model may generate an output indicating the second synthetic availability of the second resource. By doing so, the system may generate synthetic availabilities of the resources to be used when processing a blockchain action (e.g., allocating resources to facilitate a service).

In a financial services embodiment, the availability characteristics represent may refer to a characteristic of an asset (e.g., good/currency/medium of exchange) associated with a bank branch (or a user account at that bank branch). In such embodiment, the availability characteristics may be issuing authority information (e.g., a recognized government or central monetary authority within a country), legal tender information (e.g., whether it is authorized by the government for settling debts, transactions, and payments within or outside of the country's borders), denomination and/or amount information, physical form (e.g., bank notes and coins), type (e.g., fiat, commodity backed), security features (e.g., printed security features, cryptocurrency security protocol information, encryption standards), exchange rate information, stability information, regulation information, market demand information, supply information, volatility information, utility information, divisibility information, availability status (e.g., ability to be retrieved or used in transaction, whether the bank branch holding the asset is open) or other information related to an asset. Such characteristics may be used to determine a synthetic liquidity (or other synthetic valuation) of the bank branch based on the availability characteristics of assets held at the bank branch. By doing so, a value may be accorded to liquidity of a bank branch (or a user's account) even when the bank branch is currently closed, thereby enabling users to complete transactions when the bank branch is currently unavailable.

Such availability characteristics may be retrieved from a database storing the availability characteristics, via real-time network monitoring, performing web scraping, or identified by another process. The system may determine a synthetic availability (e.g., for the first or second resource) by providing the set of availability characteristics to an artificial intelligence model trained to determine synthetic availabilities of resources. For example, the artificial intelligence model trained to determine synthetic availabilities of resources may be a supervised machine learning model. In other embodiments, the artificial intelligence model trained to determine synthetic availabilities of resources may be an unsupervised machine learning model. The system may provide the set of availability characteristics as input to the artificial intelligence model, and the artificial intelligence model may generate an output indicating the synthetic availability of a resource (e.g., the first or second resource).

In some embodiments, the system may determine the first synthetic availability (e.g., for the first resource) and the second synthetic availability (e.g., the for the second resource) by retrieving a last known actual availability for each of the first resource and the second resource. For example, the system may retrieve the last known actual availability for the first resource from the digital log and may also retrieve the last known actual availability for the second resource from the digital log. The system may then select the first synthetic availability from a plurality of synthetic availabilities based on the last known actual availability of the first resource. The system may also select the second synthetic availability from the plurality of synthetic availabilities based on the last known actual availability of the second resource. For example, the system may retrieve the most recent or last known actual availabilities (e.g., for the first resource and the second resource) to base a selection of the first synthetic availability and the second synthetic availability on. For example, in some embodiments, the plurality of synthetic availabilities may be predetermined, forecasted, availabilities corresponding to resources of the computing network. The system may select a synthetic availability (e.g., first and second synthetic availability) based on the last known actual availability for the respective resources of the computer network. By doing so, the system may utilize the chosen synthetic availability value as a representation or estimation of the resource's availability for future planning, decision-making, or system operations.

At step 706, process 700 (e.g., using one or more components described above) determines an aggregate availability for the first computer network. For example, the system may determine an aggregate availability for the first computer network based on the first synthetic availability and the second synthetic availability.

In some embodiments, the system may determine, using an artificial intelligence model, a first aggregate availability for the first computer network based on the first synthetic availability and the second synthetic availability. For example, the system may provide the first synthetic availability and the second synthetic availability, as input, to an artificial intelligence model trained to determine (or otherwise generate) an aggregate availability for a computer network (e.g., the first computer network). In response to the system providing the first synthetic availability and the second synthetic availability as input to the artificial intelligence model, the artificial intelligence model may generate an output. For example, the output may be an aggregate availability (e.g., the first aggregate availability) based on the first synthetic availability and the second synthetic availability. For example, the system may generate an aggregate availability to determine a network-wide availability. For instance, the aggregate availability may represent an availability of resources that may be allocated (e.g., used) to provide a service (e.g., resource allocation, transaction, etc.) across the first computer network. Due to the complex nature of service requirements and resource characteristics, the artificial intelligence model may be trained to determine an overall availability of the resources that are able to be used in connection with providing the service. As an example, by using an aggregate availability (e.g., based on synthetic/ actual availabilities) to provide a service (e.g., blockchain action, resource allocation, transaction, etc.), the system may reduce risk (e.g., of error-prone allocations, or error-prone transactions. For instance, in a financial services embodiment, the system may reduce the risk of the synthetic liquidity (e.g., to be used when completing the transaction) from deviating substantially (exceeds a threshold value) from an actual liquidity when a given resource (e.g., bank branch) that is currently unavailable (is closed at the time of the transaction), becomes available (e.g., opens for business).

In some embodiments, determining the first aggregate availability may be based on an availability status of the resources. For example, the system may detect that a first resource is currently online, and the second resource is currently offline. The system may detect the availability status of the resources via one or more network monitoring systems, sensors, or tools within the network infrastructure to continuously observe and detect the actual availability of resources. In response to detecting that a resource is currently online, the system may determine an actual availability for the resource. For example, the system may determine a first actual availability for a first resource in a manner as described above. By doing so, the system may use the most up-to-date information when generating an aggregate availability. For example, the system may determine, using the artificial intelligence model trained to determine aggregate availabilities, the first aggregate availability for the first computer network based on the first actual availability and the second synthetic availability.

In some embodiments, determining the first aggregate availability may be determined using an artificial intelligence model within a RAG framework. For example, the artificial intelligence model (e.g., first artificial intelligence model) may be an LLM that is part of a RAG framework (e.g., as described above). For example, the system may obtain the first synthetic availability for the first resource and the second availability for the second resource (e.g., from a database storing the determined first and second synthetic availabilities). The system may provide (i) the first synthetic availability, and (ii) the second synthetic availability to the first artificial intelligence model, as input. The first artificial intelligence model may be trained to generate aggregate availabilities. The first artificial intelligence model may also be communicatively coupled to a retrieval component configured to retrieve actual availabilities related to resources of the first computer network. For example, the LLM may determine whether a resource is currently available (e.g., using the network monitoring systems, sensors, or tools). If a resource is online, the LLM may access a database storing actual availabilities for resources (e.g., online resources) to be used when generating the aggregate availability. The system may then receive, from the first artificial intelligence model, the first aggregate availability for the first computer network. For example, the first aggregate availability may be based on retrieved actual availabilities for online resources. By doing so, the system may enhance aggregate availability determinations leveraging the most up-to-date information. In this way, the system may efficiently allocate resources to provide a service as the network's overall availability reflects current, real-time, resource availability information that is supplemented with synthetic availabilities of the network.

In some embodiments, the first artificial intelligence model may be communicatively coupled to a retrieval component configured to retrieve weighted availabilities related to resources of the first computer network. For example, as described above, the LLM may access a database storing a set of weights associated with resources of the first computer network. For instance, one resource may be associated with a weight that is greater than the weight of another resource. In a financial services embodiment, the system may weight a type of availability (e.g., fiat cash) greater than that of another type of availability (e.g., stock). By doing so, the system may generate the first aggregate availability based on weighted availability of resources of the first computer network. In this way, by leveraging an LLM within a RAG framework, the system may reduce risk associated with completing a transaction. For example, the aggregate availability, as determined by the LLM within the RAG framework may reduce the risk of the synthetic liquidity (e.g., to be used when completing the transaction) from deviating substantially (exceeds a threshold value) from an actual liquidity when a given resource (e.g., bank branch) that is currently unavailable (is closed at the time of the transaction), becomes available (e.g., opens for business).

At step 708, process 700 (e.g., using or more components described above) receives a request for an action. For example, the system may receive a first request to perform a first blockchain action across the first computer network. The request may be received from a user (e.g., a programmer, a computer engineer, a computer network architect, a customer, etc.). The request may be submitted via a user device (e.g., a mobile device, a smart phone, a laptop computer, etc.). The action (or alternatively, blockchain action) may be a resource allocation for providing a service. For example, a computer engineer may provide a request indicating that they would like to provide a given service using computing resources within the first computing network. In a financial services embodiment, the action may be a transaction involving a banking network. For example, the transaction request may be provided by a customer indicating that they would like to purchase a vehicle using their assets held at various bank branches within the baking network. For example, the customer may have an account at a first bank branch and another account at a second bank branch. In some embodiments, receiving the request for the action may be received in a manner similar to or the same as that as described in step 408 of process 400 (FIG. 4).

The action (or alternatively, the request for an action) may include a set of action characteristics. For example, in a computing network embodiment, the action characteristics may indicate a type of blockchain action (e.g., an allocation of computational resources), a service identifier (e.g., a network service to be provided), a timestamp (e.g., a timestamp indicating when the service is to be provided), an entity account identifier (e.g., an identifier indicating a user to which the service is to be provided for, a company identifier indicating a company to which the service is to be provided for, etc.), or other characteristics of an action to be performed. In a financial services embodiment, the action characteristics may be transaction characteristics. For example, the transaction characteristics may include an amount (e.g., denomination amount, monetary amount, amount of currency, amount of an asset, etc.), one or more conditions of the transaction, a type of resource (e.g., a type of asset, such as a stock, bond, currency, crypto currency, fiat money, etc.), a time stamp (e.g., a time at which the transaction is to be conducted), a payer user-account identifier (e.g., an account identifier identifying the payer of the transaction), a beneficiary user-account identifier (e.g., an account identifier identifying the beneficiary of the transaction), or other transaction characteristic information.

In some embodiments, the system may select a cryptographically secure digital asset based on action characteristics (e.g., of the first blockchain action). For example, as described above, the system may determine one or more characteristics of the first blockchain action. The system may provide the one or more characteristics, as input, to an artificial intelligence model trained to select cryptographically secure digital assets based on (i) action characteristics, and (ii) cryptographically secure digital asset characteristics. For example, in a computing network embodiment, each service may have its own set of requirements for providing the service, and each resource in the computing network may be associated with its own set of requirements (e.g., processing, memory, throughput limits). As such, the system may select a cryptographically secure digital asset based on action characteristics of the first blockchain action to enhance providing of such services by leveraging availability information of resources. For example, because the cryptographically secure digital assets may represent a value of availability corresponding to resources within the computing network, the system may allocate the correct amount and type of resources to provide a service within the computing network.

However, such efficient allocation (or usage of resources) is dependent on the system's selection of cryptographically secure digital assets to represent the availabilities of the resources of the computing network. As such, the system may leverage a trained artificial intelligence model that is trained on historically selected cryptographically secure digital assets with respect to historical action characteristics (e.g., of historical blockchain actions). For example, the historically selected cryptographically secure digital assets and historical action characteristics may be verified by one or more subject-matter-experts, or be verified via a success indicator (e.g., a label indicating the respective cryptographically secure digital assets and historical action characteristics resulted in a successful operation/service being provided). As such, upon providing the one or more characteristics to the artificial intelligence model, the system may receive, from the artificial intelligence model, the first cryptographically secure digital asset. For example, the system may select the first cryptographically secure digital asset based on receiving the first cryptographically secure digital asset from the artificial intelligence model.

In some embodiments, the system may recommend an alternative blockchain action to be processed. For example, the system may receive a first recommendation indicating an alternative blockchain action to be processed by providing (i) a first request to perform a the first blockchain action, and (ii) the first aggregate availability for the first computer network as input to an artificial intelligence model trained to recommend blockchain actions. The artificial intelligence model may generate an output including a recommend alternative blockchain action to be performed based on characteristics of the first blockchain action and the first aggregate availability. In a financial services embodiment, the first aggregate availability (e.g., aggregate liquidity) of a customer's assets may satisfy a risk threshold related to an amount required for the transaction (e.g., the first blockchain action). For example, the risk threshold may indicate a predetermined percentage of aggregate availability required to be present relative to the transaction amount (e.g., of the blockchain request). In other words, if the transaction to be completed is for $100,000, the risk threshold is 10%, and the aggregate availability (e.g., of the customer's assets) is $105,000, then the risk threshold may fail to be satisfied.

For example, because there is not 10% of aggregate availability left over (e.g., to act as a safety net) for completing the transaction, the system may determine that the risk threshold is failed to be satisfied and may trigger the system to generate an alternative transaction to be generated using the aggregate availability that the customer has. For example, the artificial intelligence model may generate an alternative (e.g., recommended) transaction (e.g., blockchain action) to be processed in lieu of the original blockchain action. By doing so, the system may reduce risk of incompatible blockchain actions from being processed, thereby reducing wasted computational resources expended attempting to process an erroneous/incompatible blockchain action. Moreover, in this way, the system may reduce risk being able to properly balance the digital log when resources become online (or otherwise available). For example, because the aggregate availability may involve synthetic (e.g., predicted/placeholder availability), the system may protect the integrity of the blockchain action (e.g., transaction) by allowing blockchain actions to be processed when they satisfy the risk threshold (e.g., to ensure actual availability may be correctly exchanged for the synthetic availability when resources become online).

The artificial intelligence model trained to recommend blockchain actions may be an LLM within a RAG framework. For example, the artificial intelligence model may be trained based on a set of training data including training blockchain actions and aggregate availabilities of a computing network. For example, the system may train the artificial intelligence model by providing the set of training data to the LLM during a training routine. The LLM may be communicatively coupled to a retrieval component configured to retrieve (i) similar blockchain actions historically processed by the first computer network successfully, and (ii) similar aggregate availabilities corresponding the similar blockchain actions historically processed by the first computer network successfully. The retrieved information may be provided to the LLM to be processed. The system may receive, from the LLM during the training routine, a set of candidate alternative blockchain actions (e.g., recommended alternative blockchain actions) based on the similar blockchain actions and similar aggregate availabilities. For instance, the candidate alternative blockchain actions may be generated based on the information retrieved (e.g., from a database) via the retrieval component. By doing so, the system may recommend a set of alternative blockchain actions to be processed. Additionally or alternatively, in response to receiving the set of candidate alternative blockchain actions, the system may provide a message, during the training routine, to the LLM including an accuracy value corresponding to each candidate alternative blockchain action of the set of candidate alternative blockchain actions (and/or the aggregate availabilities corresponding to such candidate alternative blockchain actions). For example, a subject-matter expert may fine tune the LLM's recommendations by providing feedback indicating whether the set of candidate alternative blockchain actions are accurate, or otherwise a good recommendation based on the determined aggregate availability of resources of the first computing network.

At step 710, process 700 (e.g., using or more components described above) processes the action using the aggregate availability. For example, the system may process the first blockchain action using the first aggregate availability. In some embodiments, the system may process the first blockchain action in a manner similar to or the same as that described in step 410 of process 400.

In some embodiments, the system may replace the synthetic availability with actual availability in the digital log. For example, the system may determine, using the one or more self-executing programs, a third synthetic availability for the first resource following the first blockchain action. For example, where the first blockchain action is to allocate resources for a given service, the system may determine that the first resource is now on-line. The system may then replace, using the one or more self-executing programs, the third synthetic availability with third actual availability in the digital log. For example, the system may replace the synthetic availability of the first resource in the digital log with the actual availability for the first resource. For instance, replacing synthetic availability represented by digital assets with actual availability represented by detected availability in the digital log involved transitioning from a theoretical or assumed state of availability (synthetic availability) to the real-time, observed, or measured state of availability (actual availability) of resources or assets within a system. As such, upon detecting that the first resource is on-line (e.g., following the first blockchain action to allocate resources for a given service), the system may replace the synthetic availability for the first resource with actual availability of the first resource in the digital log. By doing so, the system may maintain a real-time ledger of resource availability efficiently determine which resources should be used to process future requests.

In a financial services embodiment, where the first blockchain action is a transaction, and the resource is one or more banks, the system may replace the synthetic availability (e.g., a synthetic liquidity) with actual availability (e.g., actual liquidity) in the digital log. For example, following the first blockchain action, when the system determines that a bank branch is currently open, the system may replace the synthetic liquidity in the digital log with actual liquidity (e.g., as determined via one or more verification processes as described above). By doing so, the system may balance the digital log (or other ledger) to reflect the actual availability (or liquidity) of the bank-branch.

In some embodiments, the synthetic availability and the actual availability may represent bank-branch-level availabilities. For example, the synthetic availability may be a pool of synthetic availability of the bank branch when the bank branch is closed (or otherwise unavailable) and the actual availability may be a pool of actual availability of the bank-branch when the bank branch is open (or otherwise online). For instance, such pools may pool together the respective availabilities of customer accounts associated with the respective bank branch.

In some embodiments, the synthetic availability and the actual availability may represent customer-level availabilities. For example, the synthetic availability may be a customer's synthetic availability (e.g., synthetic liquidity) of assets at that bank branch, and the actual availability may be the customer's actual availability (e.g., actual availability) of assets at that bank branch. In this way, customer's may have access to all of their assets irrespective of bank branch's being open (e.g., online, available, etc.) or closed (e.g., offline, unavailable, etc.) to be used when performing one or more transactions.

In some embodiments, the system may determine an amount of synthetic availability used to process the blockchain action and replace the synthetic availability with actual availability using a self-executing program. In a financial services embodiment, in one scenario, where the aggregate availability comprises a first synthetic availability corresponding to a first bank branch and a second synthetic availability corresponding to a second bank branch, the system may replace the first and second synthetic availabilities with actual availabilities. For example, a customer may purchase a vehicle for $100,000 using a first amount of synthetic liquidity from the first bank branch (e.g., $40,000) and a second amount of synthetic liquidity from the second bank branch (e.g., $60,000). The first amount and second amount of synthetic liquidity may be associated with an amount of actual availability (e.g., liquidity) corresponding to the customer's respective accounts at each of the first and second bank branches. Since the aggregate availability in such scenario comprises synthetic availabilities, when the respective resources become available (e.g., online, open for business, etc.), the system may replace the first and second synthetic availabilities with a first and second actual availability via the self-executing program. For example, the system may deduct the amount of first synthetic availability from an amount of actual availability that the user has in their account at the first bank branch. For instance, since the first amount of synthetic liquidity is $40,000 and was used to process the transaction, the self-executing program may deduct $40,000 from the user's financial account at the first bank branch to balance the digital log. Additionally, the system may deduct $60,000 from the user's financial account at the second brank branch to balance the digital log. By doing so, the system enables transactions to occur irrespective of resource availability, thereby enhancing the user experience.

In another scenario, where the aggregate availability comprises a first synthetic availability corresponding to a first bank branch and a first actual availability corresponding to a second bank branch, the system may replace the first synthetic availability with third actual availability using a self-executing program. For example, a customer may purchase a vehicle for $100,000 using a first amount of synthetic liquidity from the first bank branch (e.g., $40,000) and a second amount of actual liquidity from the second bank branch (e.g., $60,000). The first amount synthetic liquidity may be associated with an amount of actual availability (e.g., liquidity) corresponding to the customer's account at each of the first bank branch (e.g., due to the first bank branch being closed). In such scenario, the system may deduct $60,000 from the user's account at the second bank branch (e.g., using a self-executing program). The system may also deduct, using a self-executing program, the amount of synthetic liquidity used to process the transaction (e.g., $40,000) from an amount of actual availability (e.g., liquidity) from user's account at the first bank branch when the first bank branch becomes available (e.g., online, opens, etc.). By doing so, the system may use portions of synthetic and actual availability to process transactions when one or more bank branches are closed.

In some embodiments, the system may determine an updated amount of synthetic availability following the blockchain action. For example, because the amount of synthetic availability used to process a blockchain action may differ between (i) the time at which the blockchain action was processed, and (ii) the time at which a corresponding resource becomes available, the system may determine an updated amount of synthetic availability used to process the blockchain action when a resource becomes online. For example, in a financial services embodiment, a blockchain action may be a transaction to purchase a home for $250,000, and the aggregate availability used to process the transaction includes: (i) a first amount of synthetic liquidity from a customer's account at a first bank branch of $200,000, and (ii) a second amount of actual liquidity from the customer's account at a second bank branch of $100,000. The system may detect that the first bank branch is online. The system may then determine, using a third self-executing program, a second amount of synthetic liquidity corresponding to the first amount of synthetic liquidity. For example, from the time that the transaction was processed, the determined first amount of synthetic liquidity used to determine the first aggregate availability may have changed with respect to when the resource (e.g., first bank branch) opens. As such, the system may determine an updated amount of synthetic availability, using a self-executing program, corresponding to the first amount of synthetic liquidity when the first bank branch is detected to be online. For example, the updated amount of synthetic availability may now reflect a value of $210,000.

In some embodiments, a user may specify (e.g., via a user interface) which resources they want to use to complete the blockchain action, and an amount of resources they would like to use. For example, a customer may specify to use all available assets (or a portion thereof) from a given bank branch to complete the transaction, and to supplement the transaction using assets held at other bank branches. For example, continuing with the example above, the customer may specify to use all available assets at the first bank branch to process the transaction. If there are not sufficient assets in the user's account at the first bank branch, the system may supplement the transaction by using funds at another bank branch (e.g., the second bank branch), whether synthetic or actual, to complete the transaction.

Continuing with the example above, the system may replace, using a self-executing program, the updated amount of synthetic availability (e.g., $210,000) with actual availability in the digital log. For example, because the value of the customer's assets being held at the first bank branch may have changed to this updated value, and the customer specified to use all available assets from the first bank branch, then the system may replace the updated amount of synthetic availability with a corresponding amount of actual availability in the digital log. For example, the system may deduct $210,000 of actual liquidity of the user's assets from the customer's account at the first bank branch and may deduct $40,000 of actual liquidity of the user's assets from the customer's account at the second bank branch.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Figure 8:
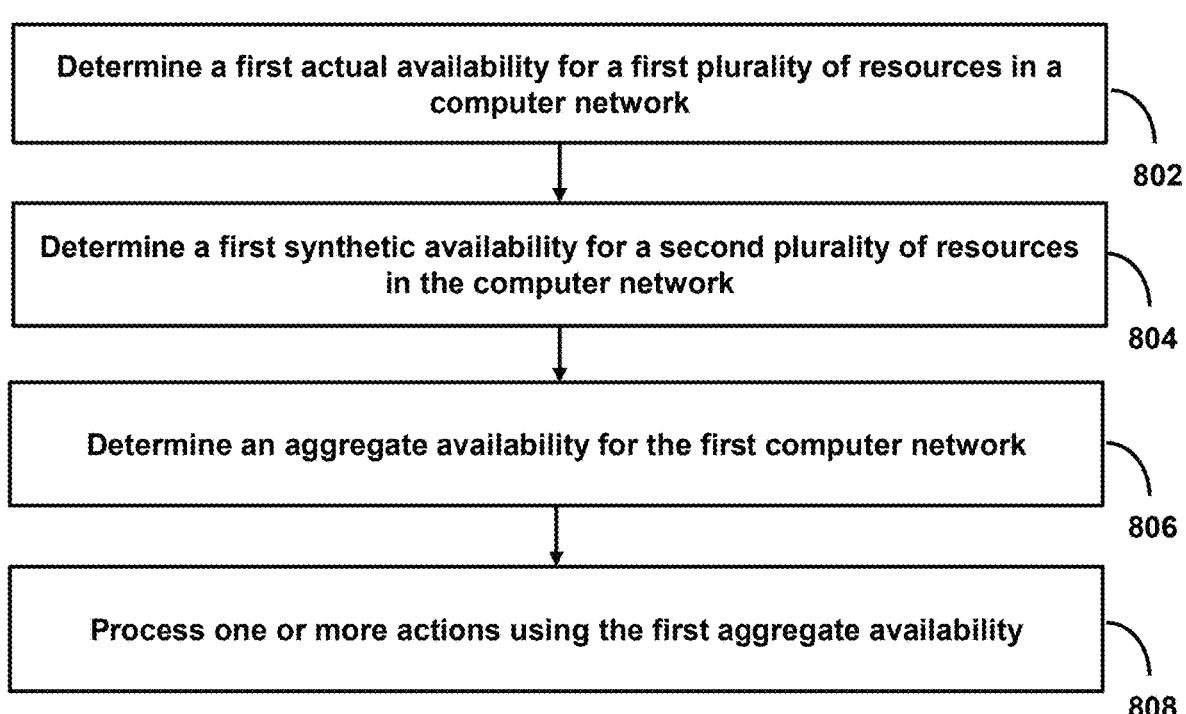
FIG. 8 shows a flowchart of the steps involved in managing global or cloud networks with using a plurality of resources, in accordance with one or more embodiments.

FIG. 8 shows a flowchart of the steps involved in managing global or cloud networks with using a plurality of resources, in accordance with one or more embodiments. For example, the system may use process 800 (e.g., as implemented on one or more system components described above) to allocate resources to a service by supplementing actual availability of resources with synthetic availability of resources.

At step 802, process 800 (e.g., using one or more components described above) determines first actual availability for a first plurality of resources in a computer network. For example, the system may determine, using a first self-executing program, a first actual availability for a first plurality of resources in a first computer network. The first plurality of resources may be currently online, and the first actual availability is represented by a first cryptographically secure digital asset(s) in a digital log. For example, the system may determine a set of actual availabilities corresponding to a first plurality of resources. For example, a first resource, a second resource, and a third resource may be part of the first plurality of resources. The system may determine a first actual availability for the first plurality of resources by adding (or otherwise combining) actual availabilities of each of the first, second, and third resources together. For example, the system may determine the actual availabilities corresponding to each of the first, second, and third resources in a manner that is the same or similar to that as described in step 402 of process 400 (FIG. 4) or steps 702-704 of process 700 (FIG. 7). By doing so, the system may determine a global actual availability of resources to be used to facilitate one or more actions.

At step 804, process 800 (e.g., using one or more components described above) determines a first synthetic availability for a second plurality of resources in the computer network. For example, the system may determine, using a second self-executing program, a first synthetic availability for a second plurality of resources in the first computer network. The second plurality of resources may be currently offline (or otherwise unavailable), and the first synthetic availability may be represented by a second cryptographically secure digital asset(s). For example, the system, the system may determine a set of synthetic availabilities corresponding to a second plurality of resources. For example, a fourth resource, a fifth resource, and a sixth resource may be part of the second plurality of resources. The system may determine a first synthetic availability for the second plurality of resources by adding (or otherwise combining) synthetic availabilities of each of the fourth, fifth, and sixth resources together. For example, the system may determine the synthetic availabilities corresponding to each of the fourth, fifth, and sixth resources in a manner that is the same or similar to that as described in step 404 of process 400 (FIG. 4) or steps 702-704 of process 700 (FIG. 7). By doing so, the system may determine a global availability of synthetic availability of (e.g., placeholder availability) resources that are currently unavailable to be used to facilitate one or more actions (e.g., allocate resources, conduct a transaction, etc.).

In some embodiments, the system may determine the first synthetic availability for the second plurality of resources in the first computer network based on a last known actual availability. For example, the system may retrieve a last known actual availability for each of the second plurality of resources from the digital log. Where the second plurality of resources includes a fourth resource, a fifth resource, and a sixth resource, the system may retrieve a last known availability for each of the fourth resource, the fifth resource, and the sixth resource. The system may combine (e.g., aggregate, add, append, etc.) the last known availabilities for each of the fourth resource, the fifth resource, and the sixth resource. The system may select the first synthetic availability from a plurality of synthetic availabilities. For example, the system may select the first synthetic availability from a plurality of synthetic availabilities based on the last known actual availability for each of the second plurality of resources. In some embodiments, the system may select the first synthetic availability from the plurality of synthetic availabilities based on the aggregated last known availabilities for each of the second plurality of resources. In other embodiments, the system may select a synthetic availability from the plurality of synthetic availabilities for each of the second plurality of resources, and then aggregate each of the selected synthetic availabilities of the second plurality of resources to determine the first synthetic availability.

At step 806, process 800 (e.g., using one or more components described above) determines an aggregate availability for the first computer network. For example, the system may determine a first aggregate availability for the first computer network based on the first actual availability and the first synthetic availability to process a plurality of blockchain actions. For instance, the system may determine the first aggregate availability for the first computer network in a manner that is the same or similar to that as described in step 406 of process 400 (FIG. 4) or step 706 of process 700 (FIG. 7). By doing so, the system may determine a network-wide availability of resources for performing or otherwise facilitating an action.

In some embodiments, the first aggregate availability may be used to process a plurality of blockchain actions. For example, the plurality of blockchain actions may be a set of transactions. For instance, the system may determine an amount of availability for all online resources (e.g., open bank branches) and offline resources (closed bank branches). The system may use the determined amounts of availability to determine the aggregate availability, which may reflect a combined availability for all online and offline resources within the computer network. Additionally or alternatively, the first aggregate availability may reflect a combined availability for all online and offline resources within the computer network that is associated with a user's account. For example, at a time of a given transaction (or set of transactions) to be performed, the system may determine the first aggregate availability based on (i) assets associated with a customer's account from the first, second, and third resources (e.g., the first actual availability), and (ii) assets associated with the customer's account from the fourth, fifth, and sixth resources (e.g., the first synthetic availability).

In some embodiments, the system may determine the first aggregate availability based on a first artificial intelligence model. For example, the system may detect that (i) the first plurality of resources are currently online, and (ii) the second plurality of resources are currently offline. In response to detecting that the first plurality of resources are currently online, the system may determine the first actual availability for the first plurality of resources. For example, the system may obtain the first actual availability for the first plurality of resources from a database as determined in step 802 above. The system may then determine, using the first artificial intelligence model, the first aggregate availability for the first computer network based on the first actual availability and the first synthetic availability. For example, the system may provide the first actual availability and the first synthetic availability as input to the first artificial intelligence model in manner that is the same as or similar to that as described in step 706 of process 700 (FIG. 7) to determine the first aggregate availability of the first computer network.

At step 808, process 800 (e.g., using one or more components described above) processes one or more actions using the first aggregate availability. For example, the system may process one or more of the plurality of blockchain actions using the first aggregate availability. The system may process the one or more of the plurality of blockchain actions in a manner that is similar to or the same as that described in steps 408-410 of process 400 (FIG. 4) or steps 708-710 of process 700 (FIG. 7). For example, as opposed to using an aggregate availability of one or more indicated resources (e.g., a first resource, the second resource, etc.), the system may process one or more blockchain actions using a global availability of the entire computing network. In other words, the system may determine a total availability of all resources within the computing network (e.g., based on actual and synthetic availabilities of all respective online/offline resources) to process a blockchain action. By doing so, the system may facilitate one or more services (e.g., allocation or resources, transactions, etc.) irrespective of resource readiness using a globally determined availability.

In some embodiments, the system may determine a processing amount to be used for processing the plurality of blockchain actions. For example, the system may determine an amount of availability needed to process the plurality of blockchain actions. In some embodiments, the system may determine an amount of availability needed to process each blockchain action of the plurality of blockchain actions and aggregate each amount of availability needed to determine an overall amount of availability needed to process the plurality of blockchain actions. For example, the system may determine the amount of availability needed to process the plurality of blockchain actions based on the action characteristics of the plurality of blockchain actions. For example, where the plurality of blockchain actions is a plurality of transactions, the system may aggregate the transaction amounts (e.g., from the transaction characteristics) together to determine the amount of availability needed to process the plurality of blockchain actions.

The system may then determine that the first actual availability fails to satisfy the amount of availability needed to process the plurality of blockchain actions. For example, the system may determine that the first actual availability is less than that of the amount of availability needed to process the plurality of blockchain actions. The system may then determine an amount of supplemental availability needed to process the plurality of blockchain actions. For example, the system may deduct (e.g., subtract) the first actual availability from the amount of availability needed to process the plurality of blockchain actions. The difference (e.g., after the deduction) may reflect the amount of supplemental availability needed to process the plurality of blockchain actions. For example, in a financial services embodiment, where the amount of availability needed to process the plurality of blockchain actions is $20,000, and the first amount of actual liquidity is $14,000, then the system may determine that the amount of supplemental availability needed to process the plurality of blockchain actions (e.g., a transaction) is $6,000.

The system may then determine a second synthetic availability corresponding to the amount of supplemental availability. For example, the system may determine that $6,000 of synthetic liquidity is needed to process the plurality of blockchain actions. The system may then generate a processing amount, based on the first actual availability and the second synthetic availability, to process the plurality of blockchain actions. For example, the system may aggregate the first actual availability and the second synthetic availability to be used to process the plurality of blockchain actions. For instance, the system may use the first actual availability and the second synthetic availability in processing the plurality of blockchain actions. By doing so, the system may enable processing of blockchain actions that are supplemented by synthetic availabilities in lieu of automatically denying blockchain actions where actual availability of a resource is unable to be used. In this way, blockchain actions may be performed irrespective of current resource readiness, thereby enhancing the user experience.

In some embodiments, the system may replace synthetic availabilities with actual availabilities. For example, the system may determine that a second resource of the second plurality of resources is now online (e.g., via one or more network monitoring sensors or tools). The system may then determine a third synthetic availability of the second resource used to process the plurality of blockchain actions. For example, the system may determine how much synthetic availability of a given resource of the plurality of second resources was used to process the plurality of blockchain actions. For example, following the financial services embodiment above, the system may determine that $2,000 of synthetic liquidity was used from a given bank branch (e.g., of the $6,000) to process the plurality of blockchain actions. The system may then replace, using a self-executing program, the third synthetic availability with a second actual availability in the digital log (e.g., −$2,000). By doing so, the system may balance the digital log to reflect a current status of actual availability for the resource following the processing of blockchain actions, thereby proving the most up-to-date information for facilitating future blockchain actions or services.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method for managing resources across global or cloud networks while mitigating issues related to providing services while resources are off-line.

A2. The method of the preceding embodiment, further comprising: determining, using a first self-executing program, a first actual availability for a first resource in a first computer network, wherein the first resource is currently on-line, and wherein the first actual availability is represented by a first cryptographically secure digital asset in a digital log; determining, using a second self-executing program, a first synthetic availability for a second resource in the first computer network, wherein the second resource is currently off-line, and wherein the first synthetic availability is represented by a second cryptographically secure digital asset in a digital log; determining a first aggregate availability for the first computer network based on the first actual availability and the first synthetic availability; receiving a first request to perform a first blockchain action across the first computer network; and processing the first blockchain action using the first aggregate availability.

A3. The method of any one the preceding embodiments A1-A2, wherein determining the first synthetic availability for the second resource in the first computer network further comprises: retrieving a last known actual availability for the second resource from the digital log; and selecting the first synthetic availability from a plurality of synthetic availabilities, based on the last known actual availability.

A4. The method of any one the preceding embodiments A1-A3, wherein receiving the first request to perform the first blockchain action across the first computer network further comprises: determining that the first blockchain action requests access to the second resource; and determining to use the first actual availability to process the first blockchain action.

A5. The method of any one the preceding embodiments A1-A4, wherein determining to use the first actual availability to process the first blockchain action further comprises: determining that the second resource is off-line; and in response to determining that the second resource is off-line, determining to use the first aggregate availability to process the first blockchain action.

A6. The method of any one the preceding embodiments A1-A5, wherein determining the first aggregate availability for the first computer network based on the first actual availability and the first synthetic availability further comprise: aggregating the first cryptographically secure digital asset and the second cryptographically secure digital asset; and determining the first aggregate availability based on aggregating the first cryptographically secure digital asset and the second cryptographically secure digital asset.

A7. The method of any one the preceding embodiments A1-A6, wherein processing the first blockchain action using the first aggregate availability further comprises: determining a second aggregate availability for the first computer network following the first blockchain action; and determining, using a third self-executing program, a second synthetic availability for the second resource following the first blockchain action.

A8. The method of any one the preceding embodiments A1-A7, wherein processing the first blockchain action using the first aggregate availability further comprises: determining an amount of availability needed to process the first blockchain action; using the first actual availability to process the first blockchain action; deducting the amount from the first synthetic availability to determine a second synthetic availability for the second resource; and determining a third synthetic availability for the first resource corresponding to the amount.

A9. The method of any one the preceding embodiments A1-A8, further comprising: determining that the second resource is now on-line; and replacing, using a fourth self-executing program, the first synthetic availability with a second actual availability in the digital log.

A10. The method of any one the preceding embodiments A1-A9, further comprising: determining that the first resource is now off-line; and replacing, using a fifth self-executing program, the first actual availability with a second synthetic availability in the digital log.

A11. The method of any one the preceding embodiments A1-A10, further comprising: determining a first characteristic of the first actual availability; and selecting the first cryptographically secure digital asset, from a plurality of cryptographically secure digital assets, based on the first characteristic.

A12. The method of any one the preceding embodiments A1-A11, wherein determining the first actual availability for the first resource in the first computer network further comprises: receiving a first verification that the first resource has the first actual availability; and recording the first cryptographically secure digital asset as corresponding to the first resource based on the first verification.

A13. The method of any one the preceding embodiments A1-A12, wherein the first verification is determined based on an amount for an off-chain record corresponding to the first resource, and wherein the first verification is received at a first blockchain network via a first oracle.

A14. The method of any one the preceding embodiments A1-A13, wherein receiving the first request further comprises: receiving, at a platform management application, a user request to perform a first off-chain action; and determining that the first blockchain action corresponds to first off-chain action.

A15. The method of any one the preceding embodiments A1-A14, wherein receiving the first request further comprises: receiving a first user request to perform a first off-chain action; and determining that the first blockchain action corresponds to the second resource.

B1. A method for managing resources across global or cloud networks while mitigating issues related to providing services irrespective of resource readiness.

B2. The method of the preceding embodiment, further comprising: determining, using a first self-executing program, a first synthetic availability for a first resource in a first computer network, wherein the first synthetic availability is represented by a first cryptographically secure digital asset in a digital log, and wherein the first synthetic availability is related to a first actual availability for the first resource; determining, using a second self-executing program, a second synthetic availability for a second resource in the first computer network, wherein the second synthetic availability is represented by a second cryptographically secure digital asset in the digital log, and wherein the second synthetic availability is related to a second actual availability for the second resource; determining, using a first artificial intelligence model, a first aggregate availability for the first computer network based on the first synthetic availability and the second synthetic availability; receiving a first request to perform a first blockchain action across the first computer network; and processing the first blockchain action using the first aggregate availability.

B3. The method of any one of the preceding embodiments B1-B2, further comprising: determining, using a third self-executing program, a third synthetic availability for the first resource following the first blockchain action; detecting that the first resource is on-line; and replacing, using a fourth self-executing program, the third synthetic availability with third actual availability in the digital log.

B4. The method of any one of the preceding embodiments B1-B3, further comprising: determining, using a fifth self-executing program, a fourth synthetic availability for the second resource following the first blockchain action; detecting that the second resource is on-line; and replacing, using a sixth self-executing program, the fourth synthetic availability with fourth actual availability in the digital log.

B5. The method of any one of the preceding embodiments B1-B4, further comprising: identifying, based on the first request, a user account identifier; determining, using a seventh self-executing program, a fifth synthetic availability for the first resource associated with the user account identifier following the first blockchain action; detecting that the first resource is on-line; and replacing, using an eighth self-executing program, the fifth synthetic availability with fifth actual availability associated with the user account identifier in the digital log.

B6. The method of any one of the preceding embodiments B1-B5, further comprising: identifying, based on the first request, a user account identifier; determining, using a nineth self-executing program, a sixth synthetic availability for the first resource associated with the user account identifier following the first blockchain action; detecting that the second resource is on-line; and replacing, using a tenth self-executing program, the sixth synthetic availability with sixth actual availability associated with the user account identifier in the digital log.

B7. The method of any one of the preceding embodiments B1-B6, wherein determining (i) the first synthetic availability for the first resource in the first computer network and (ii) the second synthetic availability for the second resource in the first computer network further comprises: retrieving a last known actual availability for each of (i) the first resource and (ii) the second resource from the digital log; and selecting the first synthetic availability and the second synthetic availability from a plurality of synthetic availabilities, based on the last known actual availability for each of (i) the first resource and (ii) the second resource, respectively.

B8. The method of any one of the preceding embodiments B1-B7, wherein determining the first aggregate availability for the first computer network further comprises: detecting that (i) the first resource is currently online and (ii) the second resource is currently offline; in response to detecting that the first resource is currently online, determining the first actual availability for the first resource; and determining, using the first artificial intelligence model, the first aggregate availability for the first computer network based on the first actual availability and the second synthetic availability.

B9. The method of any one of the preceding embodiments B1-B8, wherein determining the first aggregate availability for the first computer network further comprises: obtaining the first synthetic availability for the first resource and the second synthetic availability for the second resource; providing (i) the first synthetic availability and (ii) the second synthetic availability to the first artificial intelligence model, wherein the first artificial intelligence model is trained to generate aggregate availabilities, and wherein the first artificial intelligence model is communicatively coupled to a retrieval component configured to retrieve actual availabilities related to resources of the first computer network; and receiving, from the first artificial intelligence model, the first aggregate availability for the first computer network, wherein the first aggregate availability based on retrieved actual availabilities for online resources.

B10. The method of any one of the preceding embodiments B1-B9, wherein determining the first aggregate availability for the first computer network further comprises: obtaining the first synthetic availability for the first resource and the second synthetic availability for the second resource; providing (i) the first synthetic availability and (ii) the second synthetic availability to the first artificial intelligence model, wherein the first artificial intelligence model is trained to generate aggregate availabilities, and wherein the first artificial intelligence model is communicatively coupled to a retrieval component configured to retrieve weighted availabilities related to resources of the first computer network; and receiving, from the first artificial intelligence model, the first aggregate availability for the first computer network, wherein the first aggregate availability based on weighted availabilities of resources of the first computer network.

B11. The method of any one of the preceding embodiments B1-B10, further comprising: determining a first characteristic the first blockchain action; providing the first characteristic to a second artificial intelligence model trained to select cryptographically secure digital assets based on action characteristics and cryptographically secure digital asset characteristics; and receiving, from the second artificial intelligence model, the first cryptographically secure digital asset.

B12. The method of any one of the preceding embodiments B1-B11, further comprising: receiving a first recommendation indicating an alternative blockchain action to be processed by providing (i) the first request to perform the first blockchain action and (ii) the first aggregate availability for the first computer network to a second artificial intelligence model trained to recommend blockchain actions; and processing the alternative blockchain action in lieu of the first blockchain action.

B13. The method of any one of the preceding embodiments B1-B12, wherein the second artificial intelligence model comprises a Large Language Model (LLM), and wherein the LLM is trained, the training of the LLM comprising: obtaining a set of training data comprising training blockchain actions and aggregate availabilities of a computing network; providing the set of training data to the LLM during a training routine, the LLM being communicatively coupled to a retrieval component configured to retrieve (i) similar blockchain actions historically processed by the first computer network successfully and (ii) similar aggregate availabilities corresponding to the similar blockchain actions historically processed by the first computer network successfully to be provided to the LLM; receiving, from the LLM during the training routine, a set of candidate alternative blockchain actions based on (i) similar blockchain actions historically processed by the first computer network successfully and (ii) similar aggregate availabilities corresponding to the similar blockchain actions historically processed by the first computer network successfully; and in response to receiving the set of candidate alternative blockchain actions, providing a message, during the training routine, to the LLM comprising an accuracy value corresponding to each candidate alternative blockchain action of the set of candidate alternative blockchain actions.

B14. The method of any one of the preceding embodiments B1-B13, wherein determining the first synthetic availability for the first resource in the first computer network further comprises: identifying a set of availability characteristics associated with the first resource; and determining the first synthetic availability for the first resource by providing the set of availability characteristics to a third artificial intelligence model trained to determine synthetic availabilities of resources.

B15. The method of any one of the preceding embodiments B1-B14, further comprising: obtaining a set of training availability characteristics corresponding to a respective resource of a set of resources, wherein each training availability characteristic is labeled with an availability value associated with the respective training availability characteristic; providing the set of training availability characteristics as input to the third artificial intelligence model during a training routine to generate a first prediction indicating a predicted synthetic availability of a third resource; and updating one or more parameters of the third artificial intelligence model based on an accuracy metric between the predicted synthetic availability of the third resource and a known synthetic availability of the third resource.

C1. A method for managing resources across global or cloud networks while mitigating issues related to providing services while resources are off-line.

C2. The method of the preceding embodiments, further comprising: determining, using a first self-executing program, a first actual availability for a first plurality of resources in a first computer network, wherein the first plurality of resources is currently online, and wherein the first actual availability is represented by a first cryptographically secure digital asset in a digital log; determining, using a second self-executing program, a first synthetic availability for a second plurality of resources in the first computer network, wherein the second plurality of resources is currently offline, and wherein the first synthetic availability is represented by a second cryptographically secure digital asset in the digital log; determining a first aggregate availability for the first computer network based on the first actual availability and the first synthetic availability to process a plurality of blockchain actions; and processing one or more of the plurality of blockchain actions using the first aggregate availability.

C3. The method of any one of the preceding embodiments C1-C2, wherein determining the first synthetic availability for the second plurality of resources in the first computer network further comprises: retrieving a last known actual availability for each of the second plurality of resources from the digital log; and selecting the first synthetic availability from a plurality of synthetic availabilities, based on the last known actual availability for each of the second plurality of resources.

C4. The method of any one of the preceding embodiments C1-C3, wherein determining the first aggregate availability further comprises: detecting that (i) the first plurality of resources are currently online and (ii) the second plurality of resources are currently offline; in response to detecting that the first plurality of resources are currently online, determining the first actual availability for the first plurality of resources; and determining, using a first artificial intelligence model, the first aggregate availability for the first computer network based on the first actual availability and the first synthetic availability.

C5. The method of any one of the preceding embodiments C1-C4, wherein determining the first aggregate availability further comprises: determining an amount of availability needed to process the plurality of blockchain actions; determining that the first actual availability fails to satisfy the amount of availability needed to process the plurality of blockchain actions; deducting the first actual availability from the amount of availability needed to process the plurality of blockchain actions to generate an amount of supplemental availability needed to process the plurality of blockchain actions; determining a second synthetic availability corresponding to the amount of supplemental availability; generating a second aggregate availability based on the first actual availability and the second synthetic availability; and using the second aggregate availability to process the plurality of blockchain actions.

C6. The method of any one of the preceding embodiments C1-C5, further comprising: determining that a second resource of the second plurality of resources is now online; determining a third synthetic availability of the second resource used to process the plurality of blockchain actions; and replacing, using a self-executing program, the third synthetic availability with a second actual availability in the digital log.

D1. A tangible, non-transitory, machine-readable medium storing instructions that, when executed by a data processing apparatus, cause the data processing apparatus to perform operations comprising those of any of embodiments A1-A15, B1-B15, or C1-C6.

D2. A system comprising one or more processors; and memory storing instructions that, when executed by the processors, cause the processors to effectuate operations comprising those of any of embodiments A1-A15, B1-B15, or C1-C6.

D3. A system comprising means for performing any of embodiments A1-A15, B1-B15, or C1-C6.

What is claimed is:

1. A method for managing resources across global or cloud networks while mitigating issues related to providing services while the resources are off-line, the method comprising:

receiving, via a user input, a request to process a blockchain action; and executing the blockchain action, wherein executing the blockchain action comprises:

determining, using a first self-executing program, a first actual availability for a first plurality of resources in a first computer network, wherein the first actual availability is represented by a first cryptographically secure digital asset;

determining, using a second self-executing program, a first synthetic availability for a second plurality of resources in the first computer network, wherein the first synthetic availability is represented by a second cryptographically secure digital asset;

determining a first aggregate availability for processing a plurality of blockchain actions across the first computer network based on the first actual availability and the first synthetic availability; and processing one or more of the plurality of blockchain actions using the first aggregate availability.

2. The method of claim 1, wherein determining the first actual availability for the first plurality of resources in the first computer network further comprises:

receiving a first verification that the first plurality of resources has the first actual availability; and recording the first cryptographically secure digital asset as corresponding to the first plurality of resources based on the first verification.

3. The method of claim 2, wherein the first verification is determined based on an amount for an off-chain record corresponding to the first plurality of resources, and wherein the first verification is received at a first blockchain network via a first oracle.

4. The method of claim 1, wherein determining the first synthetic availability for the second plurality of resources in the first computer network further comprises:

retrieving a last known actual availability for the second plurality of resources; and selecting the first synthetic availability from a plurality of synthetic availabilities, based on the last known actual availability.

5. The method of claim 1, further comprising:

receiving a first request to perform the one or more of the plurality of blockchain actions across the first computer network; and determining to process the one or more of the plurality of blockchain actions based on the first request.

6. The method of claim 1, further comprising:

receiving a first request to perform the one or more of the plurality of blockchain actions across the first computer network; and determining that the one or more of the plurality of blockchain actions are requesting access to the second plurality of resources.

7. The method of claim 1, wherein determining the first aggregate availability for the first computer network based on the first actual availability and the first synthetic availability further comprises:

aggregating the first cryptographically secure digital asset and the second cryptographically secure digital asset; and determining the first aggregate availability based on aggregating the first cryptographically secure digital asset and the second cryptographically secure digital asset.

8. The method of claim 1, wherein processing the one or more of the plurality of blockchain actions using the first aggregate availability further comprises:

determining a second aggregate availability for the first computer network following the one or more of the plurality of blockchain actions; and determining, using a third self-executing program, a second synthetic availability for the second plurality of resources following the one or more of the plurality of blockchain actions.

9. The method of claim 1, wherein processing the one or more of the plurality of blockchain actions using the first aggregate availability further comprises:

determining an amount of availability needed to process the one or more of the plurality of blockchain actions;

using the first actual availability to process the one or more of the plurality of blockchain actions;

deducting the amount from the first synthetic availability to determine a second synthetic availability for the second plurality of resources; and determining a third synthetic availability for the first plurality of resources corresponding to the amount.

10. The method of claim 1, further comprising:

determining that the second plurality of resources is now on-line; and replacing, using a fourth self-executing program, the first synthetic availability with a second actual availability in a digital log.

11. The method of claim 1, further comprising:

determining that the first plurality of resources is now off-line; and replacing, using a fifth self-executing program, the first actual availability with a second synthetic availability in a digital log.

12. The method of claim 1, further comprising:

determining a first characteristic of the first actual availability; and selecting, based on the first characteristic, the first cryptographically secure digital asset.

13. The method of claim 1, further comprising:

receiving, at a platform management application, a user request to perform a first off-chain action; and determining that the one or more of the plurality of blockchain actions corresponds to the first off-chain action.

14. The method of claim 1, further comprising:

receiving a first user request to perform a first off-chain action; and determining that the one or more of the plurality of blockchain actions corresponds to the second plurality of resources.

15. A system, the system comprising:

one or more processors; and one or more non-transitory, computer-readable mediums comprising instructions recorded thereon that when executed by the one or more processors cause operations comprising:

determining, using a first self-executing program, a first actual availability for a first plurality of resources in a first computer network, wherein the first actual availability is represented by a first cryptographically secure digital asset in a digital log;

determining, using a second self-executing program, a first synthetic availability for a second plurality of resources in the first computer network, wherein the first synthetic availability is represented by a second cryptographically secure digital asset in the digital log;

determining a first aggregate availability in the digital log for processing a plurality of blockchain actions across the first computer network; and processing one or more of the plurality of blockchain actions using the first aggregate availability.

16. The system of claim 15, wherein determining the first synthetic availability for the second plurality of resources in the first computer network further comprises:

retrieving a last known actual availability for the second plurality of resources; and selecting the first synthetic availability from a plurality of synthetic availabilities, based on the last known actual availability.

17. The system of claim 15, wherein the instructions cause further operations comprising:

receiving a first request to perform the one or more of the plurality of blockchain actions across the first computer network; and determining to process the one or more of the plurality of blockchain actions based on the first request.

18. The system of claim 15, wherein the instructions cause further operations comprising:

receiving a first request to perform the one or more of the plurality of blockchain actions across the first computer network; and determining that the one or more of the plurality of blockchain actions are requesting access to the second plurality of resources.

19. The system of claim 15, wherein determining the first aggregate availability for the first computer network based on the first actual availability and the first synthetic availability further comprises:

aggregating the first cryptographically secure digital asset and the second cryptographically secure digital asset; and determining the first aggregate availability based on aggregating the first cryptographically secure digital asset and the second cryptographically secure digital asset.

* * * * *